INVENTORS
GREGORY E. MELLEN
JAMES C. NELSON
ROBERT G. CLEVENGER

BY *Griffin and Branigan*
ATTORNEYS

TASK TABLE CONTROL FLAG WORD

| AVAIL-ABILITY | | TT1 | | TT2 | | TT3 | | TT4 | | | | | | | | | | TTJ | |
|---|---|---|---|---|---|---|---|---|---|---|---|---|---|---|---|---|---|---|---|
| B | B | F | E | F | E | F | E | F | E | ••• | ••• | ••• | ••• | ••• | ••• | | | F | E |
| X | X | Y | Y | Y | Y | Y | Y | Y | Y | | | | | | | | | Y | Y |

XX = 00 TASK TABLES AVAILABLE  
    11 TASK TABLES NOT AVAILABLE  
    01 ⎫  
    10 ⎭ NOT USED: ILLEGAL CODES

YY = 00 TASK TABLE EMPTY  
    01 TASK TABLE LOADED  
    11 TASK TABLE FULL

O.M. ADDR.

| TASK TABLE BOUNDARIES | |
|---|---|
| START (TT1) | END (TT1) |
| 105 | 120 |
| START (TT3) | END (TT3) |
| START (TT4) | END (TT4) |
| START (TT5) | END (TT5) |
| START (TTJ) | END (TTJ) |

365

O.M. ADDR.

| TASK TABLE REFERENCE CONTROL | |
|---|---|
| READ (TT1) | WRITE (TT1) |
| 113 | 120 |
| READ (TT3) | WRITE (TT3) |
| READ (TT4) | WRITE (TT4) |
| READ (TT5) | WRITE (TT5) |
| READ (TTJ) | WRITE (TTJ) |

436

O.M. ADDR.

| TASK TABLE PRIORITY LIST | |
|---|---|
| TASK ADDRESS | PRIORITY |
| TASK ADDRESS | PRIORITY |
| BTIA$_6$ | 2 |
| TASK ADDRESS | PRIORITY |

263

| TASK TABLE 1 |
|---|
| |
| |
| |
| |
| |

O.M. ADDR.

| | TASK TABLE 2 |
|---|---|
| 105 | |
| 106 | |
| 107 | |
| 110 | |
| 111 | |
| 112 | |
| 113 | BTIA$_1$ |
| 114 | BTIA$_2$ |
| 115 | BTIA$_3$ |
| 116 | BTIA$_4$ |
| 117 | BTIA$_5$ |
| 120 | |

| TASK TABLE 3 |
|---|
| |
| |
| |
| |
| |
| |

| TASK TABLE J |
|---|
| |
| |
| |
| |
| |

*Fig. 2*

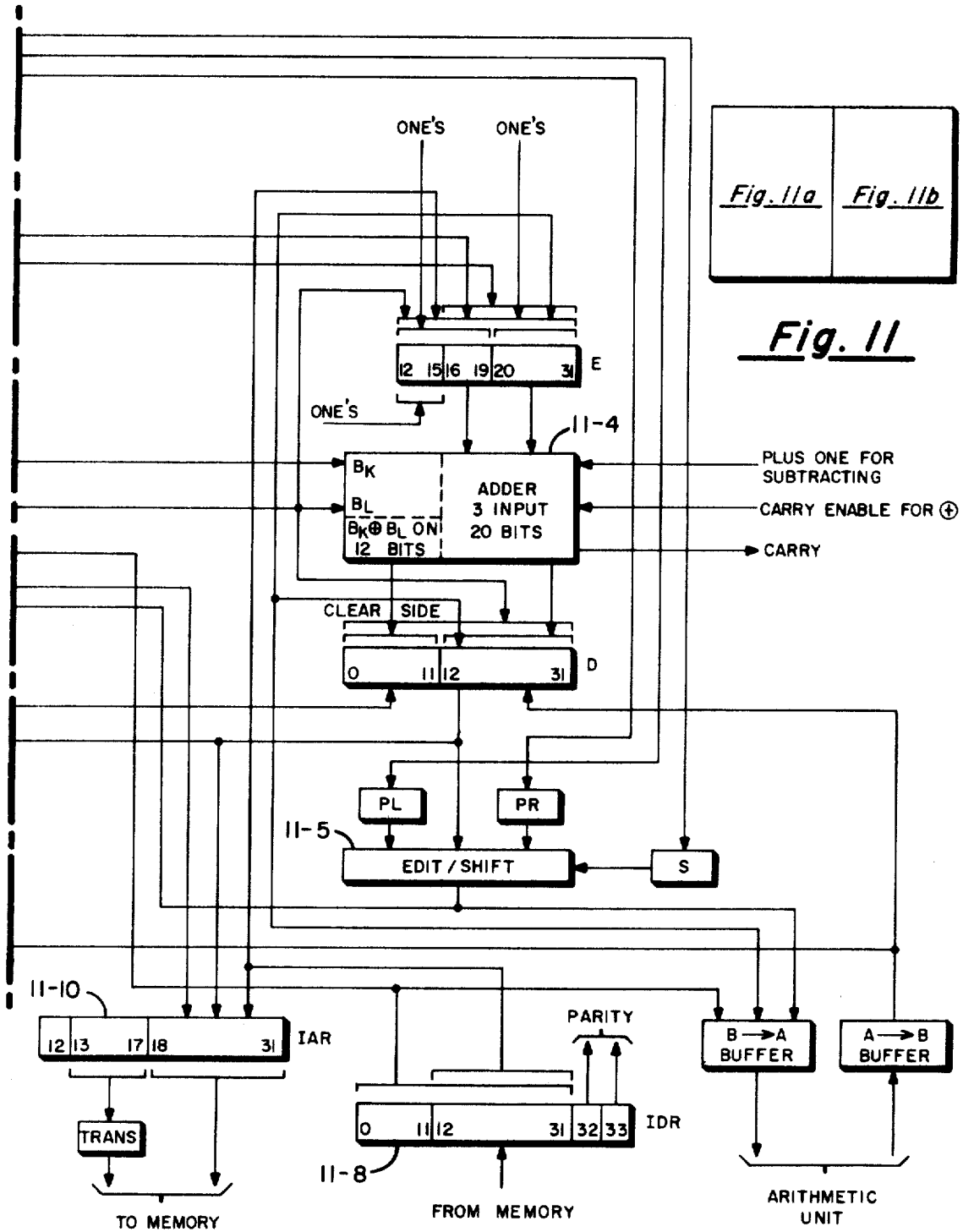
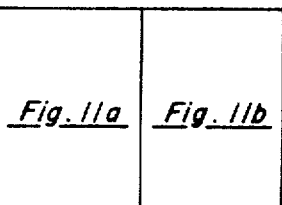
Fig. 11b

# United States Patent Office 3,530,438
Patented Sept. 22, 1970

3,530,438
TASK CONTROL
Gregory E. Mellen, Bloomington, and James C. Nelson, Rosemount, Minn., and Robert G. Clevenger, Vienna, Va., assignors to Sperry Rand Corporation, New York, N.Y., a corporation of Delaware
Filed Dec. 13, 1965, Ser. No. 513,226
Int. Cl. G06f 9/18
U.S. Cl. 340—172.5
42 Claims

ABSTRACT OF THE DISCLOSURE

The disclosure describes a take task programming method including the steps of determining from a control flag memory area the highest priority task table filled with an address of a beginning instruction word of an unassigned task, using the result of the determination to acquire from a corresponding reference control memory area the address of the address of the beginning instruction, and sampling the acquired address to obtain the address of the beginning instruction word of a program.

---

This invention relates to novel methods and means of computer task control, and more particularly, to executive programming techniques for both the setting and taking of new tasks by a processor which may be part of a multiprocessor system.

The multiprocessor concept of system organization has become an important tool both in tailoring new computers to newly emergent applications and in raising the overall achievable efficiency of the hardware and software. Paramount among these considerations is therefore a processor designed for multiprocessor organization. The processor is the main decision maker in the system. It accesses the instructions stored in memory and sequences them for execution. The instruction control decodes the command words read from the common memory and interprets the operations to be performed. It draws upon the index memory, contained in the processor, to modify the operand addresses in the instructions and then requests words from common memory through the data access control. These words are sent to the arithmetic memory in the processor and are used in carrying out those instructions involving arithmetic operations. Other instructions cause the contents of the processor's arithmetic memory to be stored in one of the common memory modules. In a multiprocessor system improved capability is achieved by splitting the basic computing functions into various subsystems. The memory is divided into many modules, identical control and arithmetic functions are combined asychronously in each processor unit, and the input/output function is modular. In such an organization, each functional module can operate independently of, and simultaneously with, all other modules. Such a computing system will operate faster and be capable of performing more operations per unit of time than computers organized along more conventional lines. Each processor has access to each memory and each input and output control module (through memory). With this organization, one processor can gain access to a program while referencing data and, simultaneously, a different processor can use other memories. A further increase in capability is achieved by the programmer (or compiler) arranging tasks for parallel execution.

In any application, the number of processor, memory, and input/output control modules is flexible. If the application changes, the number of these functional modular components in the multiprocessor can be altered to meet the new computing requirements. If more (or less) capability is required, it is obtained by adding (or deleting) processors; if more capacity is desired, additional memory can be added.

The multprocessor is one example of new organizations which achieve higher speed by doing more operations in parallel. However, in a multiprocessor system (where by definition there is more than one processor), task control is required when a current task is completed to determine which new task should be initiated. It is not necessary to decide "what processor" should do "what task," since each processor can execute any task. Task control has as its primary function the assignment of all jobs required of the system so that the completion of each task is assured. It must further ensure that each task is completed on time, even as dynamically changing new demands are placed on the system. To accomplish these scheduling tasks and allow the system to be used at full capacity, task control must establish new priorities. In all cases, task control assumes that the computing system is capable (sufficient memory capacity and processing speed) of handling the total load requested. Therefore, the executive control program and means in performing task scheduling need only assign or reassign priorities as each new task is initiated (or deleted). As the demand work load and sub-task priorities change, in order to make optimum use of each of the available processors as well as the other system modules of memory, input/output control and peripherals, the non-contiguous task lists are altered (to change these priorities) by simply inserting new addresses. These new addresses change the order in which priority of task lists are related.

This invention relates to methods and means of processor task control. The subject of interest here is the control of tasks which will be executed by the processors. The invention described belongs to that class described as "program controlled (working) with a number of lists each with different priority." It is flexible, reliable, and simple, especially with respect to methods which depend on special task-assignment hardware and complex program linkages.

The control of processor tasks involves three distinct phases: (1) the generation of requests for tasks and the assignment of priorities to the requests; (2) the ordering of the requests in "task tables" according to their respective priorities; and (3) the one-by-one removal of the requests from the task tables as processors become free to accept new assignments. Requests for processor tasks can come from several sources: (1) from the processors themselves which, as they execute their current tasks, determine the need for subsequent tasks; (2) from the external world via the input-output section—in a conventional system these would be interrupts, but here they do not "interrupt"; and (3) from fault-detection circuits, which request error diagnosis tasks. The processors employ familiar program control procedures to generate task requests-test of flags, counters, status words, etc. Task requests from the input-output section result from: (1) an operator action, such as a request for display; (2) a normal status signal from an external subsystem, such as a completion interrupt from a tape unit, or (3) an abnormal (error) interrupt from an external subsystem, as an illegal-character signal from a card punch.

Task requests are entered in the task tables by means of a "Set Task" sequence which in turn operates command generator means for the transfer and manipulation of data. This sequence can be performed either in the processor, or in the I–O controller, depending on which is originating the request. The Set Task sequence performs certain preliminary tests of the task tables, enters the task request in its assigned priority queue, and updates the table(s) in preparation for the next entry. When a processor finishes its current task, it interrogates the task tables for a new assignment. In each instance, the new assignment will be for the execution of the oldest task request having the highest priority. That is, all priority "1" requests will be honored, starting with the oldest one first, before any priority "2" requests will be granted, and so on for priority "3" and following. Further, a new request of priority 1 will be honored ahead of all priority 2 requests regardless of their age. These various functions are accomplished by means of a "Take Task" sequence which is performed in the processor by its command generator means. The Take Task sequence operates in a manner similar to the Set Task sequence: it makes preliminary tests of the task tables, it extracts the oldest request of the highest priority, and it performs the housekeeping necessary to condition the tables for the next Take Task sequence.

It is therefore one primary object of the present invention to provide an executive control programming technique and means whereby a data processing unit can set or enter a task request into any one of several different task request storage areas each of different priority.

A further primary object of the present invention is to provide an executive control programming technique and means whereby a data processing unit can take or extract the oldest task request from the task request storage area of highest priority.

These and other objects of the present invention will become apparent during the course of the following description, to be read in view of the drawings, in which:

FIG. 2 illustrates the various memory storage areas set aside for task control;

FIGS. 5, 6, 7, 8, 9, 10, 11a and 11b are block diagrams showing the general organization of a specific multiprocessor system which can be programmed for task control.

Figure 1:
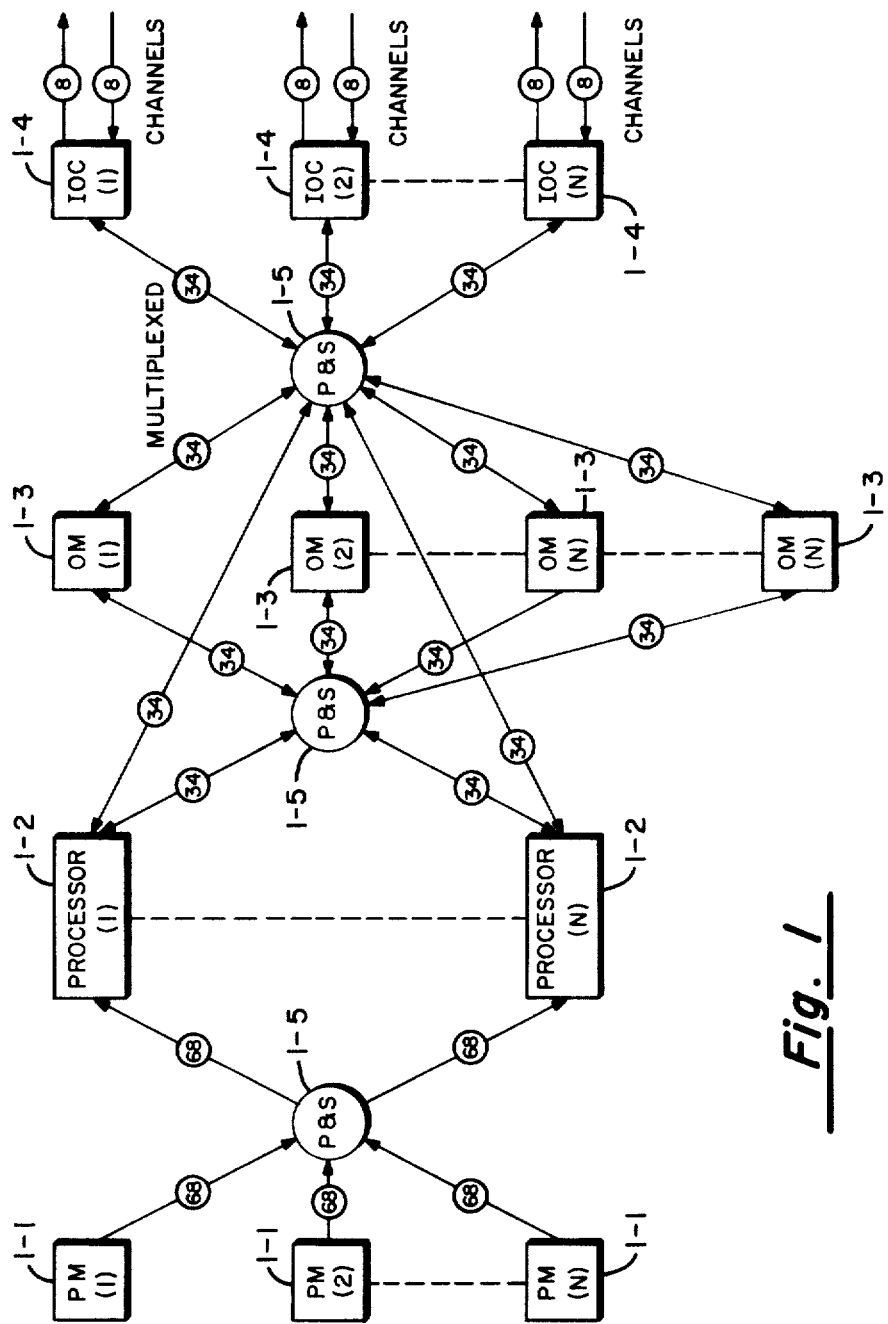
FIG. 1 is a simplified overall block diagram of a multiprocessor system.

Multiprocessor system description—FIG. 1

A block diagram of a typical multiprocessor system appears in FIG. 1. At the left of the diagram are modules of Program Memory 1–1 which contain the various tasks which the system is to execute. Next are the Processor Units 1–2, which are the active arithmetic and logical elements of the system. To the right of the processors are modules of Operand Memory 1–3, which store variables, constants, and the task control information necessary to co-ordinate the operation of the system. At the right of the diagram are the Input-Output Control Units 1–4, which interface the external word. Connecting the various modules-program, processor, operand, and I–O are modular arrays of data and control paths, collectively referred to as the Priority and Switching Networks 1–5. Via this network, the modules of Program Memory 1–1 are separately and simultaneously accessible by the Processors 1–2. Similarly, the modules of Operand Memory 1–3 are separately and simultaneously accessible by both Processors 1–2 and I–O Control Units 1–4.

Each Processor Unit 1–2 may be considered as a "central computer," insofar as that term implies the active, programmable, element of a system. All processors are identical, and there is no processor which, by virtue of either special hardware or special software, is the "master" or "controlling" processor. Each processor is self-sufficient with respect to program execution; there is no dependency between them such that any processor can execute any task in Program Memory. As many tasks can be simultaneously performed as there are processors in the system. They share no common same areas of Operand Memory as a medium of communication and coordination between tasks or programs. Thus, all processors have access to all areas of Program and Operand Memory. The instruction repertoire of the processor includes a full complement of arithmetic, logical, and housekeeping instructions for operating its command generators. A decision to make all processors identical and capable of performing any task implies that each processor must also be capable of performing executive system control, which may itself be considered a task (rather, a set of tasks). The same decision, which can be generalized into a philosophy to have no central critical hardware in any part of the system, also carries the implication that "executive system control" be not a black box or single program, the failure of which could abort the operation of the entire system. Instead, the means of control should be distributed among the various self-sufficient modules and/or capable of regenerating itself if it should fail.

The system modules operate asynchronously with respect to one another. This condition holds true both at the instruction level and at the program or task level. At the instructional level, there are no master timing pulses to keep the processors in synchronization. Similarly, at the task level, there is no need for a master start signal to initiate all tasks simultaneously (such a feature could be programmed, however, if the program demanded it). Neither may the processors communicate directly with each other; rather, a processor may store data or control information in Operand Memory, where it can be referenced by other processors. As a result, each processor functions independently with no reliance on other processors in the system. If all processors but one failed, the surviving processor could continue to fulfill all system functions. A decision to give this form to the system design is based on simulated system runs which indicate that asynchronous operation yields higher efficiency. A processor can begin a new task as soon as it completes its current task, without waiting for a master system pulse to occur. Note that such a pulse would have to be tied to the longest task, making all tasks equivalent in time. Alternatively, all tasks would have to be the same length, a forbidding if not impossible programming problem. This aspect of system design—asynchronous and non-communicating processor operation—has a twofold effect on task control. First, it rules out any technique which depends on all processors being available at the same time for a new task assignment. Second, it eliminates the possibility of assigning a processor—any processor— to be temporarily in control and giving new assignments *directly* to the others as they completed their current tasks.

The Priority and Switching Network 1–5 is so designed that modules can be added to or subtracted from the system. If the application changes so as to require more computing ability, the number of processors can be increased. If more storage capacity is needed, more memory modules may be added. Similarly, I–O capability can be augmented. Adaptation in the direction of lesser capability is also possible. As a special case, the "multiprocessor" system may consist of one module each of program and operand memory, one processor, and one I–O control unit. Executive system control must take this variable system capability into account and the novel task control invention disclosed herein is fully adaptable to such a special case. Further, executive control must function even under unplanned and unpredictable changes in capability. For example, if one or more system modules should fail, task control must, and does, keep the remaining modules operating at the highest attainable efficiency.

System input-output operations are carried out essentially independently of processing. In general, for an output operation, a processor formats the information and stores the output data in Operand Memory 1-3. The same processor then stores a group of control words in a designated area of Operand Memory, an area assigned by the program to control a given output channel. At this point, the processor has finished its part of the output function and is free to start a new task. The control words contain the starting address of the output channel, the number of words to be transferred, and any special instructions such as tape unit number. When the output channel completes its current operation (if any), the I–O control unit will interrogate the area reserved to that channel in Operand Memory, will procure the control words, and will execute the output. Input operations are performed in much the same manner. The I–O control unit stores the input data in Operand Memory (without the assistance of a processor) and then notifies the system that the input data has been received. Normally, this notification occurs via some task control procedure which could be similar to the task control employed by a processor. However, for error control and other contigencies, the I–O control unit may immediately interrupt a processor. The decision to separate the processing and input-output functions is based on system efficiency. If each processor has its own I–O facilities, only that processor could communicate with the associated external equipment. If the input or output transfers had to be executed on a cyclic (timetable) basis, serious scheduling problems could result. Probably, the processor(s) so involved would be unavailable for general task assignment and the capability of the system would be reduced.

The multiprocessor system organization of FIG. 1 therefore has the following characteristics:

(a) Specialization is avoided. Modules are identical within function groupings, so that the function of a failing module can be assumed by another. A failure causes a decrease in the over-all capacity of the system but in no instance aborts the entire system. In other words, the system "degrades gracefully." Further, the failure of one module does not cause the loss of another (as, e.g., in the hybrid system where failure of a processor causes the loss of its associated private memory).

(b) Many options are provided. Memory capacity, word size, arithmetic speed, I–O facilities, and other parameters are variable within the system framework. The functional-module construction accommodates options since manufacturing changes are localized to separate areas and do not balloon out to affect the system.

(c) Parallel asynchronous operations are utilized wherever possible. Processors, memory modules, and I–O channels may all be simultaneously active. The modules do not operate in synchronism, and, within the processor, operations are overlapped asynchronously within the broad limits of overall instruction timing. The absence of timing restrictions results in a net increase in speed and permits the system to meet the speed requirements imposed.

In a multiprocessor system such as shown in FIG. 1, as many tasks may be simultaneously performed as there are processors. If a reservoir of programs is stored in a memory common to all processors (i.e., Program Memory), a given processor may begin a new task as soon as it completes its present one. The question presents itself as to which new task should it begin. The degree of system sophistication needed to answer this question degree of system sophistication needed to answer this question depends largely on the particular application; whether certain (or all) tasks must be performed in real time, certain (or all) tasks must be performed in real time, whether certain tasks must be given priority over others, whether some tasks may be called for on a random basis or are cyclical and must be reiterated at fixed intervals, etc. Some tasks may be interrelated in that they must be performed in a certain sequence; others may be isolated and independent tasks. Some tasks may have a deadline for completion; others may have no specific time requirements. In practice, a particular task will have a combination of these attributes.

The nature of the tasks may also vary widely. Assume, for example, a very large multiprocessor system which is operated to serve a large community as a public utility. In such a public utility system, there would be one other most important requirement. There must be positive control to prohibit one user from gaining access to his competitor's files, or in fact, to any files except his own. In other words, data security must be maintained. For small businessmen, the programmed tasks may include payroll, credit and collection, and inventory problems—a typical mix of business applications. For university users, the tasks may include numerical analysis, data reduction, and other kinds of "scientific" applications. For still other users, the multiprocessor system may be programmed for real-time banking or reservation file maintenance.

Task control—which may be defined simply as the procedure for determining which new task should be assigned to an available processing unit—must take into account all of the requirements of the tasks themselves, as outlined above. The present task-control invention is flexible enough, without any change in hardware, to accommodate all task requirements from the simple to the complex. It must be assumed, of course, that the system has adequate capability (in terms of both memory capacity and processing rates) to handle all critical tasks under peak traffic conditions. It should be noted that task control is only one part (but the largest part) of a broader scope problem which is that of executive system control. In addition to task control, executive system control must also provide for dynamic memory allocation, which assigns working memory areas to the tasks by possibly assigning a new area on each iteration of a task. The allocation function is responsible for avoiding conflicts in memory usage by different tasks, and for setting the lockouts which restrict a task to only its assigned area. Executive system control also covers input-output scheduling. In some multiprocessor systems, where each processing unit has its own input-output facilities, this function could be included in normal processor task control. In other multiprocessor systems, however, input-output is divorced from processing and must be separately controlled.

TASK CONTROL SEQUENCES

From the previous description, three points can be summarized as being desirable for task control:

(1) *Reliability.*—Task control should not reside in a single Program or a single piece of hardware.

(2) *Freedom from Time Constraints.*—Task control cannot depend on any kind of system synchronism.

(3) *Flexibility.*—Task control must adapt instantly to changes (reductions, especially) in system capability.

The task control invention herein described consists in general of three parts:

(1) Certain areas in Operand Memory are reserved for task control. As many "task tables" are established as there are levels of task priority. In addition to the task tables, Operand Memory also contains control information for proper referencing of the tables.

(2) Every discrete task in Program Memory is terminated by an unconditional jump to the start of a "Take New Task" sequence. This sequence determines which new task will be assigned to a processor.

(3) Means are provided for one task to initiate subsequent or subordinate tasks by entering requests into the task tables. Entry is made via a "Set Task Request" sequence.

Both the "Take Task" and the "Set Task" sequences make use of an instruction for locking and unlocking the task tables, such that only one processor at a time can reference the tables.

TASK CONTROL AREAS—FIG. 2

FIG. 2 shows the areas in Operand Memory reserved for task control. These areas may be any place in memory and need not be contiguous. Areas at the bottom of the diagram (TTI through TTJ) are the Task Tables 1 through J. Each represents a different level of priority and may be of whatever length is required to accommodate the beginning instruction addresses in Program Memory of all tasks of the respective priorities. That is to say, there can be provided for each task table area one or more Operand Memory addressable storage locations each of which in turn is used for holding a Program Memory address of the beginning instruction for a specifield task or program. The user may elect to program the system such that the priorities of the tasks may be varied from iteration to iteration. This choice does not affect task control in any way, except that the task tables should then be made of equal length. The last task table J is normally treated differently from the others in that it always contains an entry. If no other task requests exist, a free processor will take its assignment from the last task table, and perform system exercise and maintenance.

The area of Operand Memory labelled Task Table Boundaries is used to define the starting and ending Operand Memory addresses of each task table. There are as many Operand Memory addressable storage locations provided for the Task Table Boundaries (TTB) area as there are Task Tables 1 through J, with each said TTB storage location containing a word comprised of two Operand Memory addresses which are the START and END addresses defining the position and extent, i.e., the beginning and the ending, of its respective task table storage locations. The boundary values are not altered in the normal course of task control, but only when the task table areas in Operand Memory themselves are changed (relocated, lengthened, etc.). Instead, the boundary table serves to keep the task-table references made by the Take Task and Set Task sequences within the defined task table areas.

The Operand Memory area labelled Task Table Reference Control (TTRC) keeps a running count of where the next references to the task tables should be made. As in the case of the TTB area above, there are as many Operand Memory storage locations provided for the TTRC area as there are task table areas, with each said TTRC storage loaction containing a word comprised of two Operand Memory addresses identified as Write and Read. Each Write address controls the loading of a task request into a respective task table area; each Read address, the taking of a task by a processor from a respective task table. The Write address is incremented as each task is loaded into the identified task table. Similarly, the Read address is incremented as each task is taken from the task table. When either the Write or Read address reaches the END address of the task table found in a TTB word it is reset to the START address of the task table. This function is achieved through use of the task table boundary addresses and is more fully described below.

The Operand Memory area labelled Task Table Priority List (TTPL) is used to hold beginning instruction Program Memory addresses, and their priorities, of tasks to be set or loaded into the task tables by the processors. There are as many Operand Memory storage locations provided for the TTPL area as there are processors in the system (each processor has its own TTPL storage location), with each said TTPL storage location capable of holding a word comprised of a beginning task instruction address in Program Memory and a priority number specifying the task table into which said last mentioned address is to be stored.

The last Operand Memory area associated with task control is a single storage location containing the Task Table Control Flag word. The most significant Bit(s) B of this word (which, for numerical values would be the sign bit positions 0 and 1) indicate whether the task tables are currently being referenced by another processor or whether the tables are available for use. If this bit(s) B is 0, the tables are available; if the bit(s) B is 1, the tables are already in use and any attempt to reference them must be momentarily delayed. The other bits of the control flag word are associated with the task tables, one pair for each table. The E (Empty) flag bit is 0 whenever the associated table is empty or contains no assigned beginning task addresses, and is 1 whenever the table contains one or more as yet unassigned task requests. The F (Full) flag is 1 whenever the associated task table is filled to capacity and can accept no new beginning task addresses.

TAKE TASK SEQUENCE—FIG. 3

Figure 3:
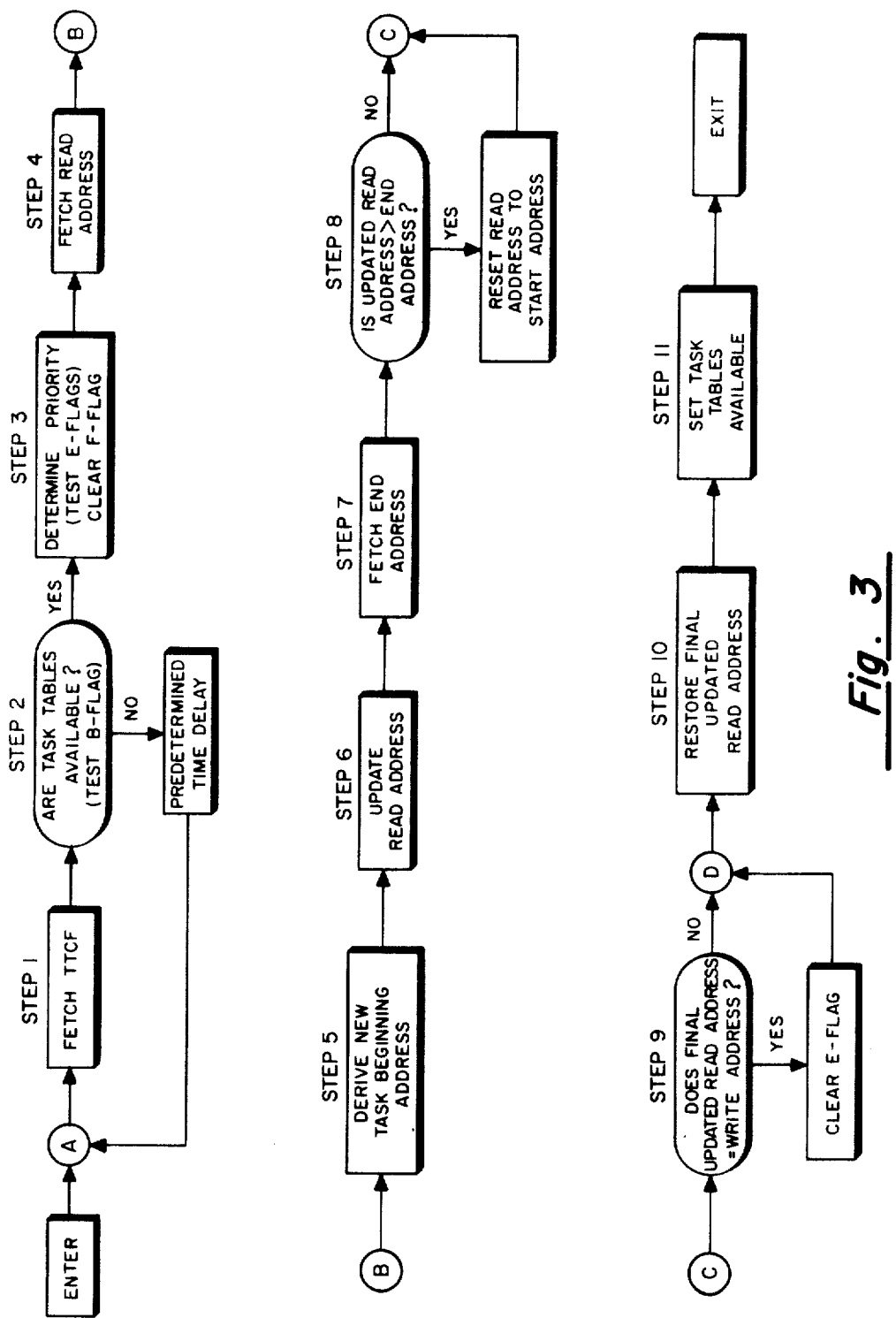
FIG. 3 is a flow chart showing the broad functional steps in the Take Task Sequence.
Figure 4:
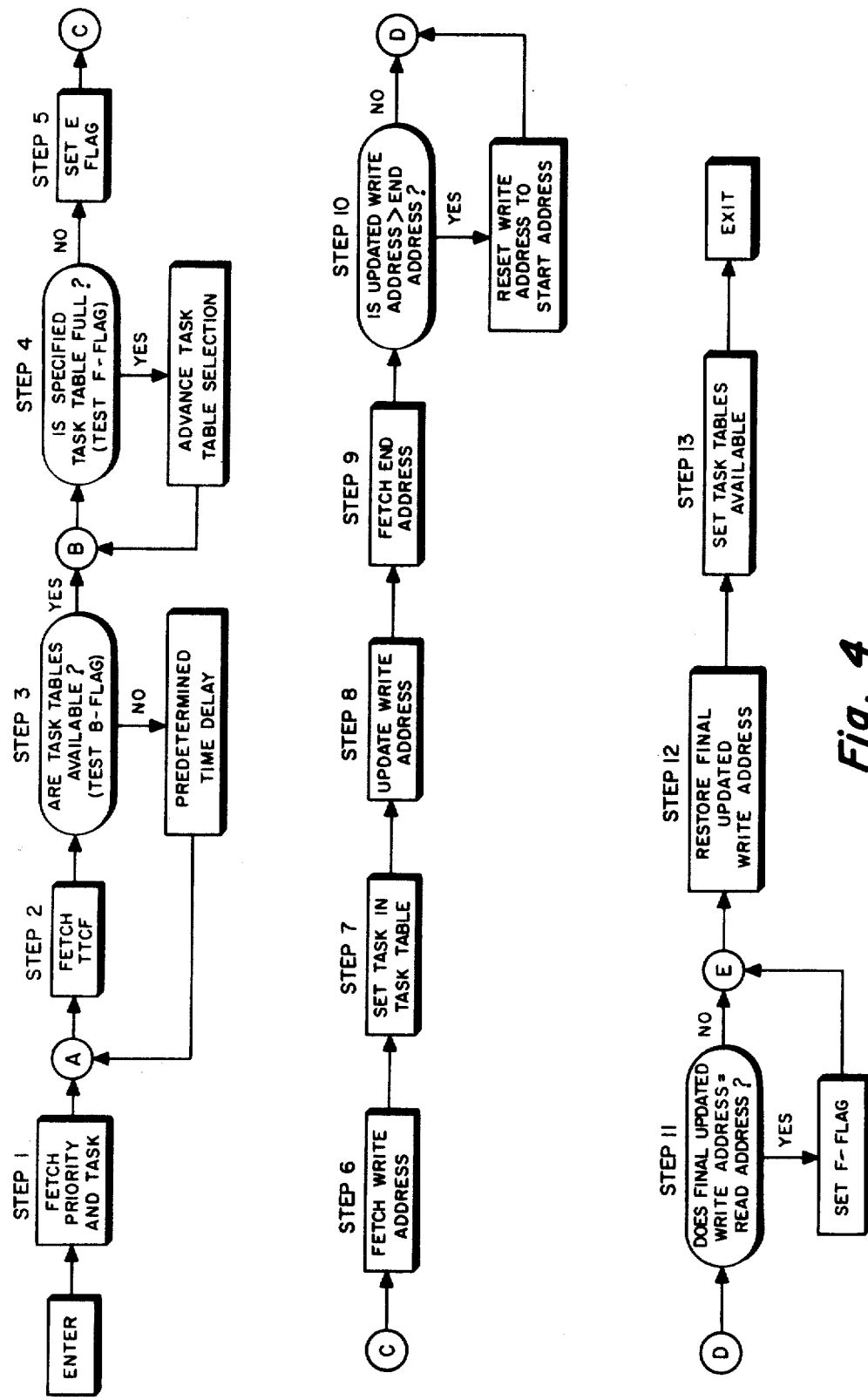
FIG. 4 is a flow chart showing the broad functional steps in the Set Task Sequence.

The following steps broadly set forth the novel Take Task sequence and are illustrated in FIG. 3. For the sake of illustration, the following system conditions will be assumed, some of which are shown in FIG. 2. In the Task Table 1 area, which is that containing the highest priority tasks to be performed by the processors, the Operand Memory storage location thereof does not hold any beginning task instruction addresses, i.e., TTI is empty. Therefore, both the TTI F and E bits in the TTCF word itself (assumed to be held in an Operand Storage location identified by octal address 512), are zeros. In Task Table 2, which is here assumed to be comprised of twelve Operand Memoiy storage locations identified by consecutive octal addresses starting with 105 and ending with 120, there are five different beginning task instruction program memory addresses $BTIA_1$, $BTIA_2$, etc. respectively stored in Operand Memory locations 113, 114, 115, 116, and 117; i.e., TT2 is neither empty nor completely full so that its TTCF F-bit is 0 and its E-bit is 1. Therefore, the TT2 Task Table Boundaries word (assumed to be held in an Operand Memory storage location identified by octal address of 365) will have a Start address portion 105 and an End address portion of 120, while the TT2 Task Table Reference Control word (assumed to be held in an Operand Memory storage location identified by octal address 436) will have a Read address portion of 113 and a Write address portion of 120.

A processor, as it completes its current task, encounters an unconditional jump to the start in (Program Memory) of the Take Task Sequence. It should be appreciated that in practice each step described below will require execution of one or more processor instructions according to the instruction repertoire of the system used.

(1) *Fetch and Lock.*—The Task Table Control Flag word is fetched from Operand Memory address 512 into the processor. This operation is preferably performed by an instruction which during the read cycle of the memory causes the exact content of the control flag word to be read into a memory data register and then transferred unchanged to the operand input section of the processor, but during the restore cycle of the memory, causes the two leading or sign bits in memory—which are the B (Busy) flag bits $xx$—to be unconditionally set to 1. Until these B bits of the restored TTCF word in Memory are cleared to 0, any attempt by another processor or an I–O control unit to use the task tables will encounter a busy condition upon acquiring said restored TTCF word from memory. Note that for task control purposes, only one B flag bit itself need to be set to 1. The second B bit is set in order not to affect the parity of the word which is checked at the memory interface. All processors and operand memory modules have the logic required to implement this step.

(2) *Test B (Busy) Flag.*—The control flag word now in the processor is tested for the value of its B bits, possibly by means of a sign-jump instruction. If positive (i.e., $xx=00$) the sequence continues to Step 3. If negative (i.e., $xx=11$), the processor waits a predetermined number of cycles and then repeats Step 1 by again withdrawing the TTCF word from Operand Memory, which by this time may have had its B bits in memory changed back to 00 by the completion of another processor's use of the task tables.

(3) *Test E Flag.*—The sequence continues by examining the TTCF E Flags in order beginning with the highest priority task table. In this example, the E flag for TT2 is the first encountered (from the left) equal to 1, indicating that no request is waiting of a priority higher than two (i.e., no TT1 request). Following this priority determination, the F flag for TT2 is unconditionally cleared so that if the task table (TT2 in this example) had been indicated to be full at the start of the sequence, it will not be indicated full at the end of it.

(4) *Fetch Read Address.*—Using the Step 3 priority determination, the Read address portion (113) in the TTRC word for TT2 is obtained by the processor from Operand Memory location 436.

(5) *Take Task.*—A fetch is now performed to the Operand Memory location 113 of Task Table 2, as specified by the TT2 Read Address. The new task beginning instruction address therein (BTIA$_1$) is temporarily parked in one of the processor's index registers for later use in a program jump.

(6) *Update Read Address.*—In the course of referencing the TT2 Read Address 113, an indexing operation is performed thereon to update same to the address of the next full Task Table 2 location, which in this example is address 114.

(7) *Fetch End Address.*—Using again the Step 3 priority determination, the TT2 Task Table Boundaries word at Operand Memory address 365 is referenced for at least its End Address portion 120.

(8) *Check for End of Table.*—The updated TT2 Read Address 114 from Step 6 is compared with the TT2 End Address 120 from Step 7. In this example, the updated Read Address is still within the Task Table 2 boundaries, since it is less than or equal to the End Address 120. However, had it been greater than the End Address, the Start Address 105 (from the TT2 Task Table Boundaries word) would be substituted for the Read Address, so that the final updated Read Address portion of the TT2 TTRC word would be 105 rather than 114.

(9) *Check for Empty Table.*—The final updated Read Address (here=114) is now compared with the Write Address 120 of the TT2 TTRC word. If they were equal, Task Table 2 would now be empty and the TT2 E flag would be cleared. By "empty" is meant that all BTIA values in the Task Table would have been sampled by the processors. In the present illustration, however, this is not the case.

(10) *Restore Read Address.*—The final up-dated Read Address 114 is now rewritten into the TT2 TTRC word for storage back into Operand Memory location 436.

(11) *Terminate.*—The Task Table Control Flag Word, with B bits=00 and having perhaps been updated in Steps 3 and 9, is now restored to its proper place 512 in Operand Memory, thus unlocking the task tables for use by other processors. This concludes the Take Task Sequence. The processor then jumps to the beginning task address BTIA$_1$ (from Step 5) in Program Memory and commences execution of the new task.

SET TASK SEQUENCE—FIG. 4

Requests for the performance of new tasks can come from at least two sources: from the processors themselves and from the external subsystems. Before a processor can request a task, however, it must determine that the task is needed. Conventional programming techniques not part of the present invention are used to make this determination. For example, in the course of executing a task "J" a processor may check a counter in Operand Memory to determine if a task "K" has been executed seven times and may test a flag to see if a task "L" is at least half complete. If these conditions are true, the processor may then request that a task "M" be performed. If not, the processor may request that a task "N" be performed. First, however, a priority for task "M" or "N" must be established. The task may have the same priority on each iteration. Or, it may receive highest priority if some critical time, T$i$, has passed; it may receive second priority if a clock reads between T$j$ and T$i$, etc. Once the processor has placed the priority and the beginning task instruction address BTIA into the Task Table Priority List location reserved for use by the processor, the processor can then proceed with the Set Task sequence. For the sake of illustration, the same system conditions are here assumed as were used for the Take Task description, but further including an assumed Operand Memory Octal address of 263 for holding the processor TTPL word whose "task address" portion (BTIA$_6$) is to be placed into Task Table 2 (as specified by the "priority" portion of the TTPL word).

(1) *Fetch TTPL.*—The processor is programmed to acquire the TTPL word from octal address 263 of Operand Memory.

(2) *Fetch and Lock.*—The processor then performs the Fetch and Lock step by fetching the Task Table Control Flag word from Operand Memory location 512, but restoring said TTCF word back into memory with its B bits=11.

(3) *Test B Flag.*—The control flag word is tested for sign. If negative (i.e., $xx$=11) the processor waits and repeats. If positive (i.e. $xx$=00), the processor proceeds to Step 4.

(4) *Test F Flag.*—It has been assumed that the priority in the TTPL word requires that the task request (BTIA$_6$) is to be loaded into TT2. The processor therefore tests the TT2 F flag. If the F flag were 1, however, TT2 is full (not the case here assumed). A test would then be made of the TT3 F flag, and so on until a task table with a vacancy is found is indicated by a 0F flag. It should be noted that this branch is provided only to correct for a rare occurrence, since if the task tables are properly sized, this branch will never be taken.

(5) *Set E Flag.*—If the F flag is 0, the processor sets the TT2 E flag to indicate that there is or will be at least one entry in the table. (The E flag may already be set to 1 as it is in this example—the Set E Flag operation then simply has no observed effect.)

(6) *Fetch Write Address.*—Using the priority of the TTPL word (or any advanced priority that might have been computed during Step 4) the TTRC Write address 120 for TT2 is obtained by the processor from Operand Memory address 436.

(7) *Set Task.*—A store is performed to the Task Table 2 location specified by the Write Address, so as to place the new task request BTIA$_6$ into Operand Memory address 120.

(8) *Update Write Address.*—In the course of referencing the Write Address 120, an indexing operation is performed which updates it to 121.

(9) *Fetch End Address.*—Using the priority, the TT2 Task Table Boundaries word at address 365 is referenced for its End address portion 120.

(10) *Check for End of Table.*—The updated Write Address (=121) from Step 8 is compared with the End Address (=120) from Step 9. Since the updated Write Address now exceeds the End Address, the Write Address is reset to the value of the TTB Start Address (=105) in order to keep future Task Table 2 references within the table boundaries.

(11) *Check for Full Table.*—The final Write Address 105 is now compared with the Read Address 113 as carried by the TT2 TTRC word. If they are equal (not the case here assumed) the TT2 F flag in the TTCF word would be set to 1, indicating a full task table.

(12) *Restore Write Address.*—The up-dated Write Address of 105 is restored to its place in Operand Memory location 436.

(13) *Terminate.*—The updated TTCF word, with B bits=00 is now returned to Operand Memory Location 512 thereby unlocking the task tables and completing the sequence.

To better understand and appreciate the task control concept described above, the actual sequence of instructions in a processor unit of a specific multiprocessor system will next be described. The equipment context in which these instructions operate is generally shown in FIGS. 5 through 11.

PROGRAM MEMORY (PM)—FIG. 5

Figure 5:
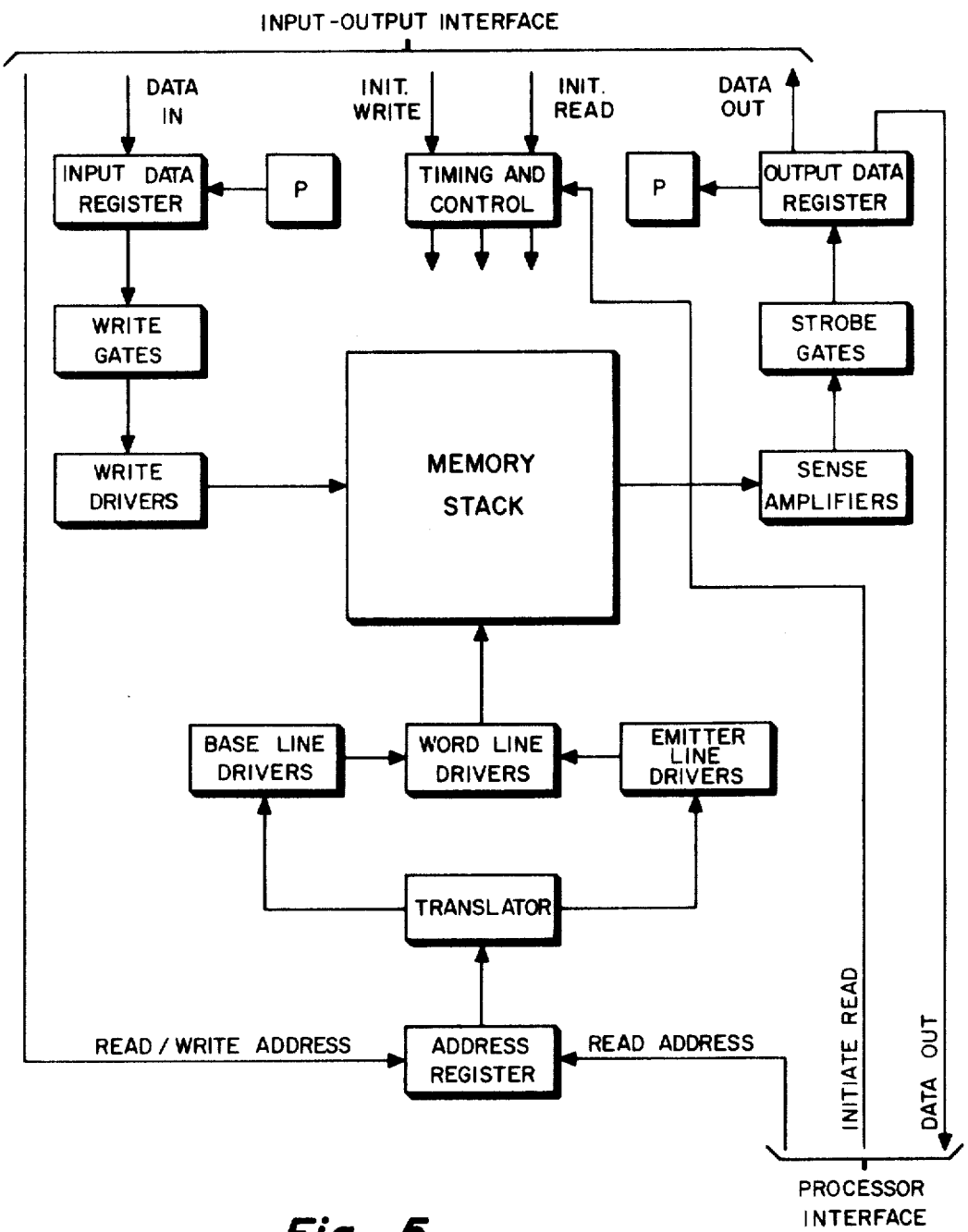
Figure 6:
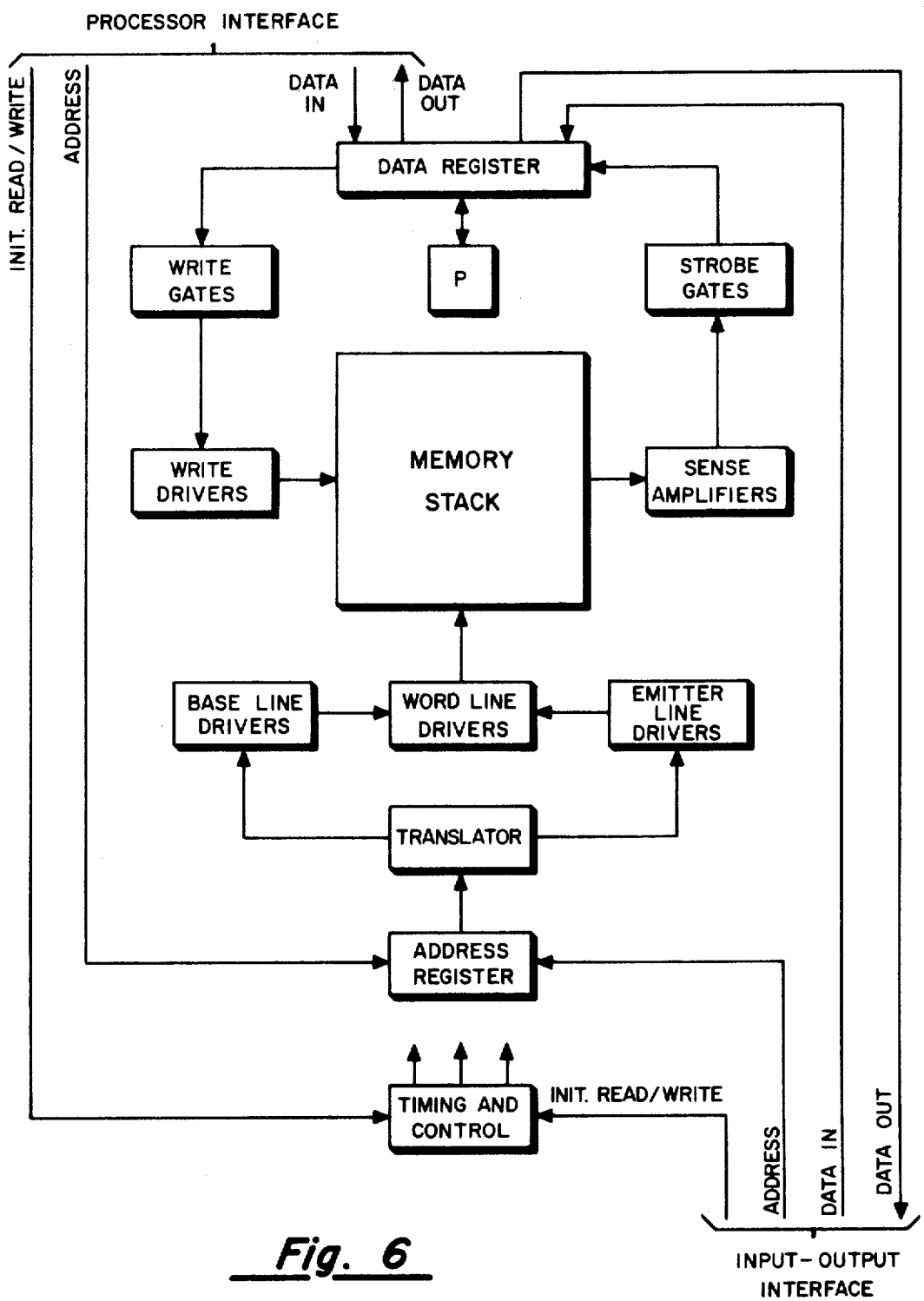

Program Memory may comprise a number of non-destructive readout (NDRO) memory modules, each containing 4,096 words of 68 bits each. FIG. 5 is a block diagram of one such module. If desired, these modules may also be used to form part of Operand Memory to provide NDRO storage for constants. As described earlier, Program Memory may be written into only via an I-O channel. The memory may be read either via the I-O channel or directly by a Processor Unit into its Instruction Buffer. Transfers to and from Program Memory occur 68 bits at a time (two 34-bit-words in parallel). Four parity bits are used, one for each 16 bit data segment. Each module operates asynchronously with respect to other modules in the system. Read or write cycles with a signal on the Initiate Read or Initiate Write line. Timing and control circuits internal to the module thereafter govern its operation until the cycle is completed. The read cycle time is 200 nanoseconds; the write cycle time is 100 microseconds.

The basic memory element is a thin film unit consisting of two superimposed magnetic films, one of high permeability and one of low. The high-permeability film retains its information (one or zero) until changed by a write operation. The low-permeability film may be switched by a read operation, but its information is automatically restored by the influence of the high-permeability film.

OPERAND MEMORY (OM)—FIG. 6

Operand Memory comprises modules similar to those of Program Memory. The chief difference is in the mode of operation which for Operand Memory is destructive readout (DRO). Operand modules may also be used to form all or part of Program Memory to provide a program area which the processors are capable of changing.

Each operand module has interfaces for communication with the Processor Units and the Input-output Control Units. Parity is added (write mode) and checked (read mode) at the data register. Two parity bits are used, one for each 16-bit data segment. The modules operate asynchronously, with internal timing and control signals being supplied in response to Initiate commands from the processors or I-O control units. The complete read-restore cycle time is 200 nanoseconds with read access time being 150 nanoseconds.

PRIORITY AND SWITCHING (P & S)—FIG. 7

The priority and switching unit provides the mechanical and electrical interfaces between the modules of the system. In addition it contains several groups of registers useful in the maintenance of the system.

Figure 7:
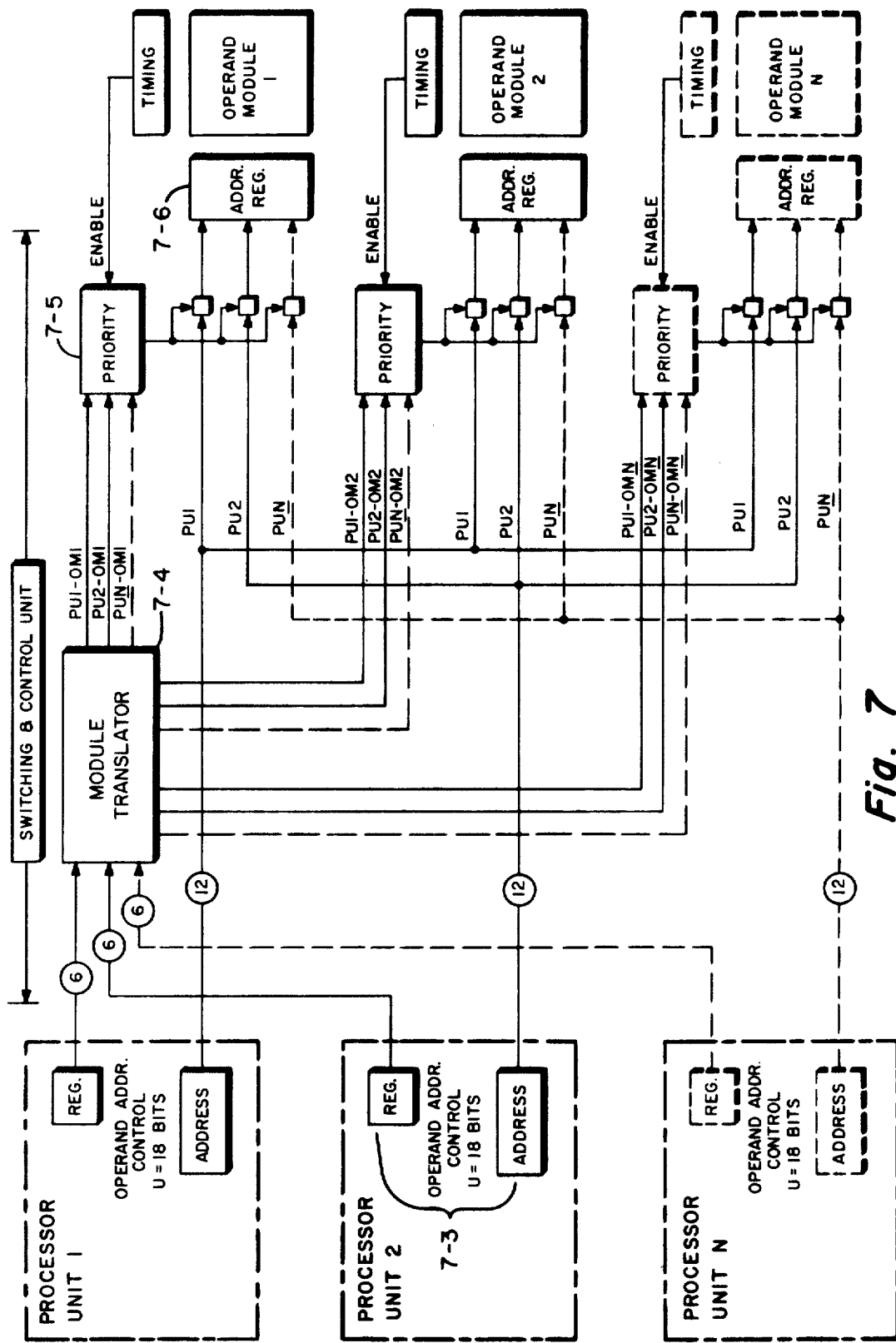
Figure 8:
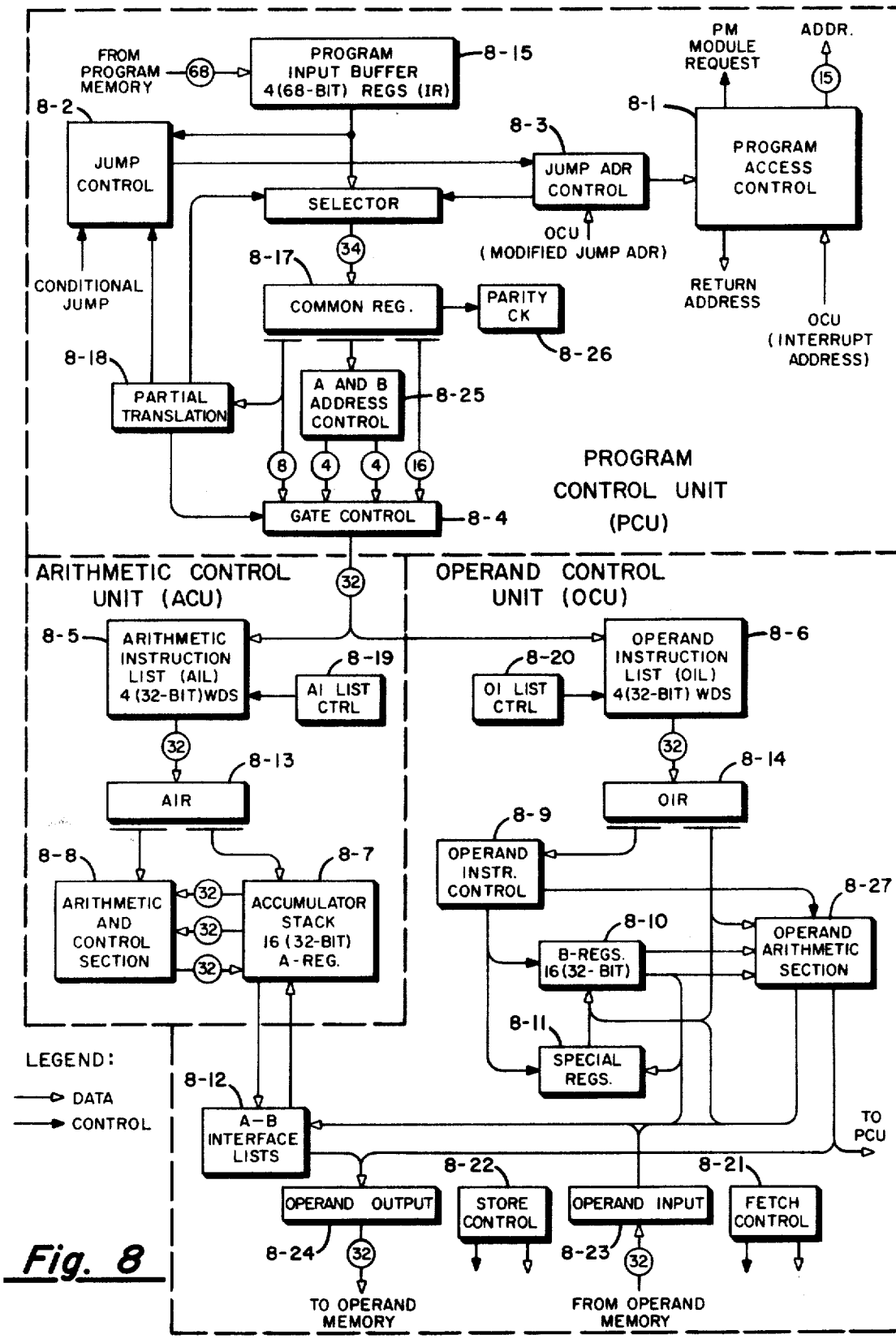

The major module interfaces appear in FIG. 1. In FIG. 7, one such interface is shown in sufficient detail to convey the principle of operation of all. This is the interface between the operand (read or write) address registers in the processors and the address registers of the individual Operand Memory modules.

Assume that Processor 2 initiates a reference to Operand Memory Module 1. An 18-bit U address appears in its operand address register 7–3. The six high-order bits of U are decoded in the Module Translator 7–4 and appear as a memory request at the priority network 7–5 associated with Operand Memory Module 1. If the module is free, the priority network immediately gates the 12 low-order bits of U to the module address register 7–6 and the memory is cycled. The priority network 7–5 also controls the gating of the data and the acknowledge signal returned to the processor, although this path does not appear in the diagram.

If the Operand Memory Module 1 is servicing another processor or I–O channel at the time the request is received, the priority network will store the request until it can be honored. The expected queue at a given operand module depends on several factors. The most important of these are (1) the ratio of the number of operand modules to the number of processors and the I–O control units, and (2) the particular instruction mix in the programs being executed, i.e., the number of instructions which require Operand Memory references and the number of extended-sequence instructions.

OVERALL PROCESSOR ORGANIZATION AND CONTROL—FIG. 8

Each processor is divided into three main functional areas. The areas are: Program Control Unit (PCU), Arithmetic Control Unit (ACU), and Operand Control Unit (OCU). The three areas operate in parallel with a minimum of control for the necessary interactions of the three groups.

The PCU's main functions are those of acquiring and sequencing instructions to other units within the processor. In addition to containing the logic 8–1 for requesting program memory words, it contains jump detecting circuits 8–2, address modification circuits (not shown), a set of index registers (not shown), several small adders for modifying certain fields of the instructions (not shown) and other necessary control circuits 8–3 and 8–4. Also associated with this area are two instruction lists 8–5 and 8–6. One holds instructions to be processed by the ACU (this list called AIL) and the other holds instructions to be processed by the OCU (this list called OIL). These lists can also be considered common to both PCU and the associated OCU or ACU, and thus are actually shown to be parts of these latter two areas.

The ACU contains a set 8–7 of arithmetic registers (called A-registers) and the logic 8–8 for performing arithmetic and logical computataions. The OCU contains the logic 8–9 for requesting operands from memory and for storing words in variable memory. It also has logic to do data manipulations, some arithmetic operations and some logical operations. Located in OCU are 16 registers 8–10 called B-registers which are used for temporary storage of data and for housekeeping operations. Also in this section are a set of special registers 8–11 used in various special functions such as interrupts and clock count downs. Located between the ACU and the OCU are two buffers 8–12. The A interface buffer holds data being transferred from the OCU to the ACU, and the B interface buffer holds data being transferred from the ACU to the OCU. The ACU and OCU each has the necessary logic to take instructions from its instruction list, and each has a respective instruction register 8–13 and 8–14 to hold the instruction during processing.

The PCU acquires words from Program Memory normally considerably ahead of the time at which they will be processed. These words are inserted into a set of holding registers 8–15. Individual instructions are sequenced from the holding registers to a common register 8–17 where they are partially translated in 8–18. Some instructions are executed entirely within PCU, others are sequenced to one of the two instruction lists 8–5 or 8–6 which in turn respectively feed ACU and OCU, others go to both of the lists, and still others are held in PCU and go to one or both of the lists. There is one instruction list for each of OCU and ACU, as well as corresponding list controls 8–19 and 8–20. These list controls each include a list-in counter, list-out counter, list-full indicator, and list-empty indicator, which allows PCU to insert instructions and the operating unit to take instructions out. When ACU or OCU needs another instruction it checks its list-empty indicator. If the list is not empty, it takes the instruction out of the list from the location specified by the list-out counter which is then advanced and the list-full indicator is cleared. A check is made to see if the list is now empty and, if so, the list empty indicator is set. Similar operations occur when PCU puts an instruction into the list. The ACU translates its new instruction and begins the operations specified. If the operation is of such extent as to allow overlapping, another instruction is acquired from the list and processing starts on this new instruction before the last is completed. ACU handles mostly arithmetic and data manipulation operations. OCU carries out fetching and storing of data by means of controls 8-21 and 8-22, packing and unpacking of data, and housekeeping operations. Interface between ACU and OCU is by way of two buffers 8-12 between ACU and OCU. Instructions which use both ACU and OCU are synchronized in this manner. Some instructions require control information to be returned from either ACU or OCU to PCU. The OCU has two separate data paths 8-23 and 8-24 which permits simultaneous fetching and storing of data from Operand Memory.

DETAILED PROCESSOR ORGANIZATION

Figure 9:
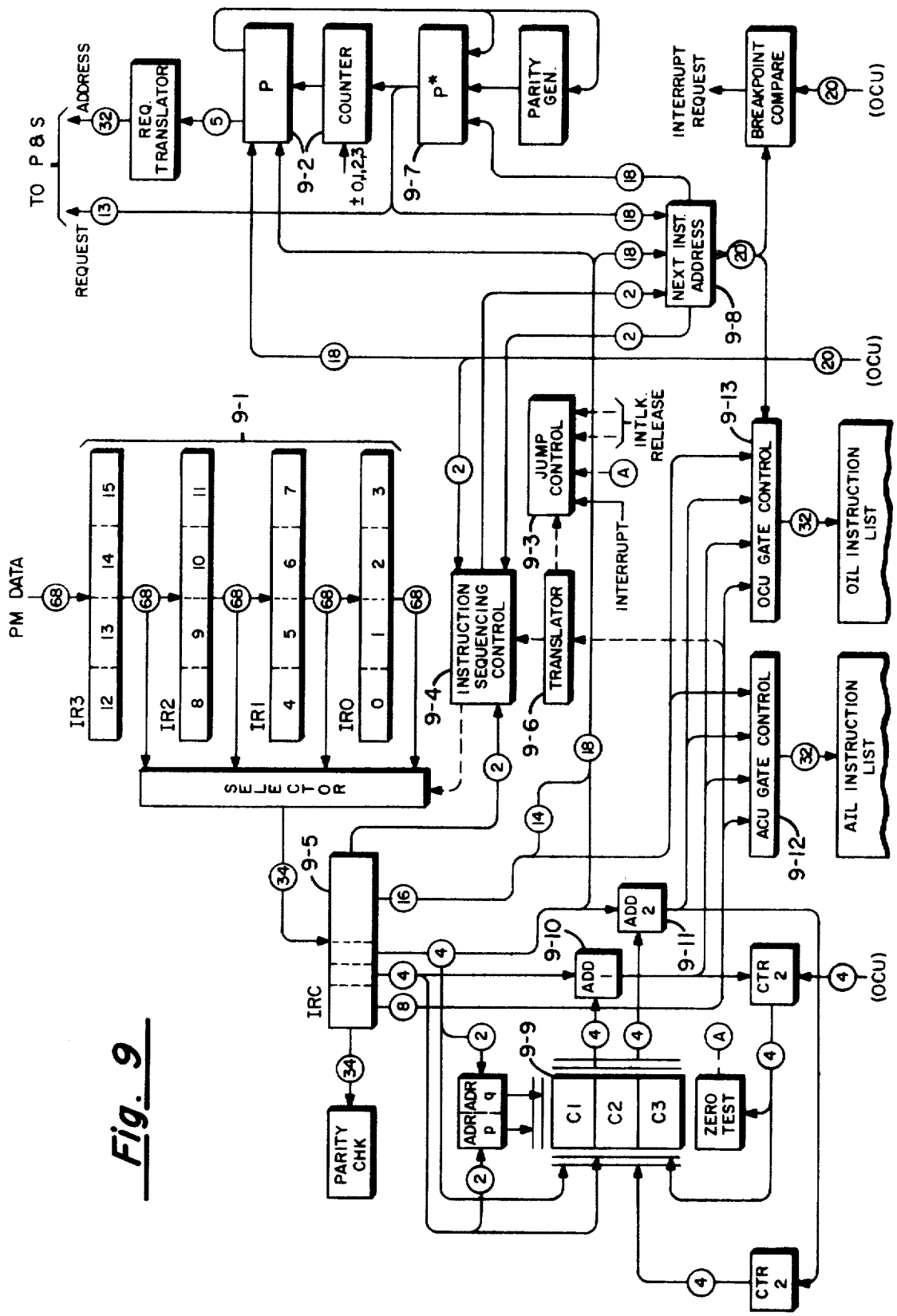

Program Control Unit (PCU)—FIG. 9

All program instructions are brought into the Processor Unit via the Program Control Unit. Control of the program acquisition is one of several functions controlled by this unit. The PCU makes a partial translation on the instruction code to facilitate jump control and to determine the destination of each instruction.

Insertion fetching from Program Memory (PM) is accomplished by the PCU through one of the three independent memory paths of the Processor. The rate at which instructions are requested by the Program Access Control is determined by the full/empty state of the Program Input Buffer 9-1 and the memory response time to successive requests. A Primary program counter 9-2 is stepped at an asynchronous rate depending on the utilization of instructions by the Arithmetic Control Unit and the Operand Control Unit, and the availability of instructions from PM. To change the sequencing of instructions, a jump command via unit 9-3 causes an 18-bit address to be injected into the program counter 9-2.

The 18-bit Primary program counter 9-2 has 5-bits to designate a particular program memory module. Thirteen bits of the Primary Program counter 9-2 are sent to the P & S unit along with the request. One of these 13 bits is parity. The other 12 bits specify a particular word among the 4096 words in the memory module.

The Program Input Buffer 9-1 has four 68-bit registers $IR_0$ to $IR_3$ which provide: overlapping of program requests; input storage for the alternate path fetch on conditional jumps; and the buffering of up to 16 instructions to allow short looping within the Processor. The normal sequencing (by unit 9-4) of instructions takes 32-bits at a time out of $IR_1$ or $IR_2$ and gates this segment into the Common Register 9-5. A partial translation 9-6 on the 8-bit operation code determines if the instruction is a jump, if the instruction is to be executed by the ACU or the OCU, and if the instruction is a 16 or 32-bit word.

Turn around time on jumps is a large factor in the average flow of instructions through the PCU. Jump detection is thus provided to reduce the turn around and minimize requests to memory that will not be used. The classes of jumps detected are Indexed, Conditional, and Unconditional and the procedure for each is different. An unconditional unmodified jump is executed entirely by the PCU and upon the detection out of the $IR_1$, future requests are held up until the unconditional jump is sequenced through and translated from the Common Register 9-5. At this time the address portion of the jump is gated into the Primary Program counter 9-2 and the request goes out. Buffering downstream in the Processor keeps the processing units supplied with instructions until the program at the jump location enters the PCU.

Conditional jumps, which require a decision from the ACU or the OCU, hold up subsequent instructions from passing from the PCU to the ACU or OCU. This has the effect of emptying the two instruction lists. When a conditional jump is detected by translation out of the Common Register 9-5 one more PM request is completed and this memory word will rest in $IR_2$ (this is the fall-through path of the branch). The alternate path of the conditional jump is then fetched into $IR_1$ by jamming the address portion of the jump into the Primary Program Counter 9-5. A Secondary Program Counter 9-7 still contains the continuation path of the program. The jump instruction continues to the OCU or ACU to be executed and determines if the condition specified is met. Whatever the decision, the PCU has both branches and will take the appropriate path depending on the result of the condition. This alternate path fetching prevents the processor from being starved for instructions while waiting for a memory reference after the decision is made.

Short-loop control is provided in the PCU to give execution of programs from entirely within the machine without a memory reference for instructions. Jump detection out of $IR_1$ is necessary to hold up future requests and to kill an outstanding program request if a short-loop, unconditional, or index command is in $IR_1$. An interrupt in the middle of a short-loop sequence will be delayed until the completion of the current short-loop. This is done to be able to recreate the same situation in the Processor on completion of the interrupt routines. A Next Instruction Address Register 9-8 contains the 12-bit memory word address and the 5-bit module address of the next processor instruction to be sequenced through the Common Register 9-5.

Another function of the PCU is the modification of A and/or B-register address fields of any instruction referencing these buffers. To facilitate the address modification three C-Registers 9-9 of 4 bits each are provided. All instructions have bits 8 through 17 channelled through two 4-bit C-adders 9-10 and 9-11 for modification, but only the instruction that is immediately preceded by the Modify Register Address (MRA) instruction will be modified by anything other than zero. The MRA permits one, two, or neither of the two C registers specified, to be modified and the next instruction following the MRA will be modified by the two C-registers. Although all instructions go through the motions of adding the C-registers, the add time is parallel to the operation code translation and does not increase the PCU sequencing time. The repertoire includes instructions to manipulate C-registers and include loading C, increment C, and jumping on C. Finally, the partially translated instructions are channelled either through the ACU Gate Control 9-12 to the AIL Instruction List, and/or through the OCU Gate Control 9-13 to the OIL Instruction List, the choice being a function of the operation code of the instruction.

Figure 10:
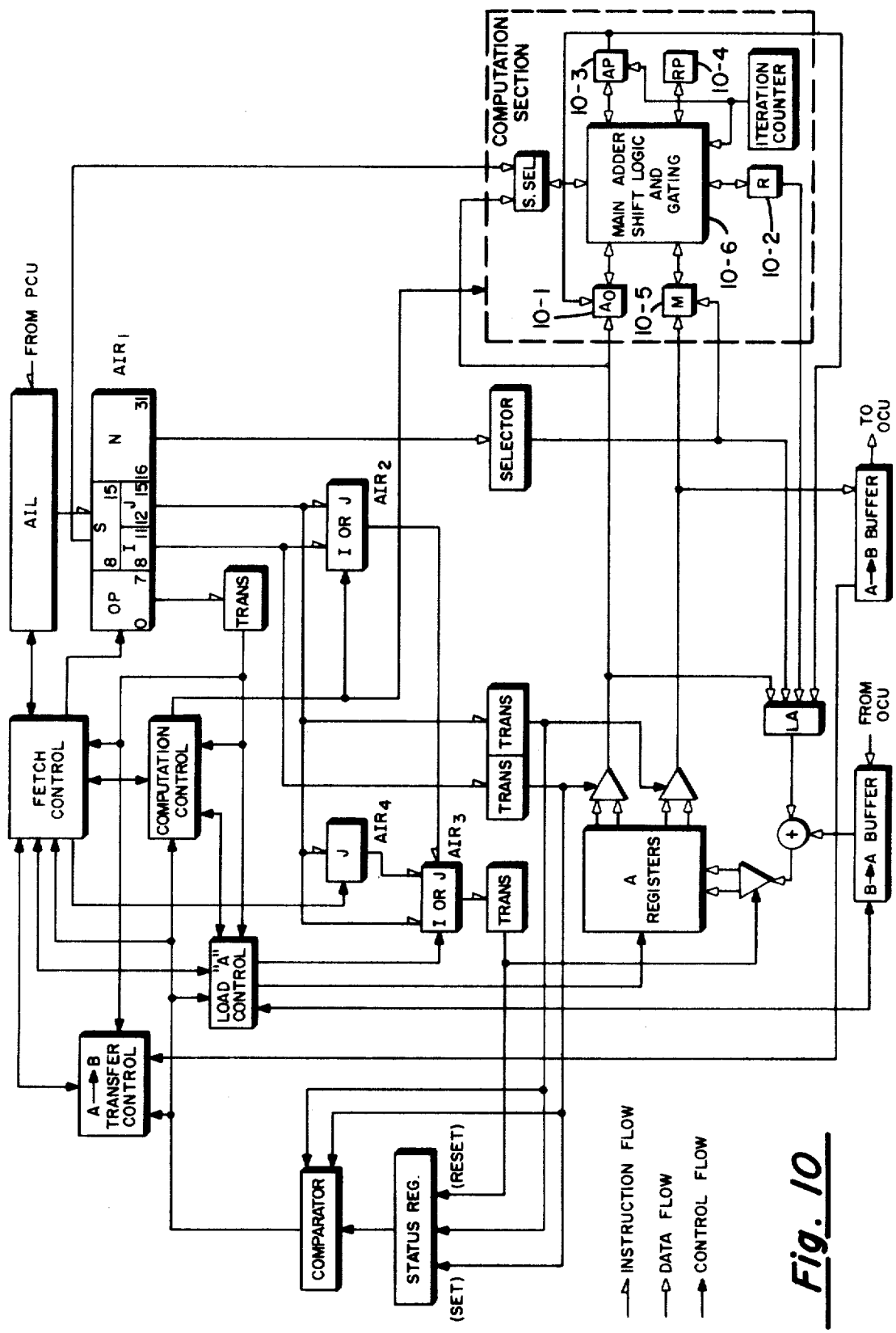

Arithmetic Control Unit (ACU)—FIG. 10

The utilization of the arithmetic section of a computer is an important factor in the through out capability of the machine. To increase the efficiency of the Processor, the arithmetic section is freed from data acquisition, program acquisition, and most housekeeping operations. Most of the operations performed by ACU are arithmetic or logical operations, but some data manipulation capacity is available in ACU. Some data transfer operations which are performed primarily in OCU also go to ACU to facilitate the exchange of data between OCU and ACU. Buffering of several forms is furnished to serve the ACU and keep its activity at a maximum. FIG. 10 is a diagram of the ACU operating registers. Instructions are put into the Arithmetic Instruction List (AIL) and held there until they are needed by ACU. A buffer of 4 instructions gives an adequate backlog of instructions to prevent, in the normal case, ACU from waiting for program memory accesses. The Arithmetic Instruction Register (AIR) holds the instruction while ACU starts the process. Hardware interlocks allow ACU to start processing the next instruction before completing its current operation with the interlocks preventing any operation which would be affected by the current instruction or which would affect the current instructions. Data is held in 16 fast, scratchpad arithmetic registers called A-registers. These registers are loaded from operand memory by OCU through a buffer between OCU and ACU called the B→A Buffer. They are stored in operand memory by OCU through the buffer between ACU and OCU called A→B buffer. Efficient programming allows the OCU to "stay ahead" of the ACU. These buffers also are used in transferring data between OCU and ACU. The operations performed by ACU are indicated by the instruction repertoire. Most instructions are only 16 bits in length and specify two 32-bit A-registers in addition to the 8-bit operation code. The 32-bit instructions are used for what are called true instructions where part of the 32 bits are used as one of the operands in the operation. Fixed Point Arithmetic is done on 32-bit data words. Floating point also uses 32-bit data words, the left 24 bits used as a mantissa and the right 8 bits as an exponent.

The first A-register 10-1 is called $A_0$ and has an extension 10-2 called R, to form a 64-bit register, called $A_0$, R or $A_0R$. The R register 10-2 is addressable in certain instructions. The $A_0R$ register is called the Primary Arithmetic Register and generally will hold the results of operations performed in ACU. A second 64-bit register 10-3 and 10-4 is called the Secondary Arithmetic Register. The most significant half of it is called AP and the least significant half is called RP. Another operating register is the M register 10-5. The M, AP, and RP registers are non-addressable. The main adder 10-6 performs the majority of the arithmetic and logic operations. Its main two inputs are $A_0$ and M. Normally, any register $A_I$ is transferred to $A_0$, and any register $A_J$ to M to start an operation, where I is the number in the second field of the instruction and J the number in the third field. Two shift paths are available. Between AP, RP, and $A_0$, R data can be shifted 0, 1, or 2 places either left or right. Between $A_0$, R and AP, RP, data can be shifted 0 or 2 places either left or right. True instructions have their constant gated into the M register and then the instruction operates as any other instruction. Many arithmetic tests are available in the form of conditional jumps.

The shifter for the ACU is capable of shifting on two paths. A shift of 0, 1 or 2 places either left or right can be made in moving data from the Secondary Arithmetic Register to the Primary Arithmetic Register, and a shift of 0 or 2 places, left or right, in moving data from the Primary back to the Secondary. The shift instructions are 16 bits long. The 8 leftmost bits, which form the operation code, specify the direction of the shift (left or right) and the location of the "shift Code." In the case of "direct" shifts, the shift code is contained in the 8 rightmost bits of the instruction itself. In the case of "indirect" shifts, the address of an register which contains the shift code is given in the 8 rightmost bits of the instructions. The acceptable codes for right shifts are as follows:

(a) 000NNNNN—$A_0$ only, endoff, sign not padded, result not rounded.
(b) 001NNNNN—$A_0$ only, endoff, sign not padded, result rounded.
(c) 010NNNNN—$A_0$ only, endoff, sign padded, result not rounded.
(d) 011NNNNN—$A_0$ only, endoff, sign padded, result rounded.
(e) 10NNNNNN—$A_0$ and R, endoff, sign padded, result not rounded.
(f) 11NNNNNN—$A_0$ and R circular.

The acceptable left shifts with their coding are:

(a) 000NNNNN—$A_0$ only, endoff, result not rounded.
(b) 001NNNNN—$A_0$ only, endoff, result rounded.
(c) 10NNNNNN—$A_0$ and R, endoff, result not rounded.
(d) 11NNNNNN—$A_0$ and R circular.

Rounding of results on a right shift means adding a 1 to bit 31 of $A_0$ if the last bit shifted out of A was a 1. On left shifts, it means adding a 1 to bit 31 of $A_0$ if bit 0 of R is a 1. N's contains the shift count, i.e., the number of places to be shifted.

Figure 11A:
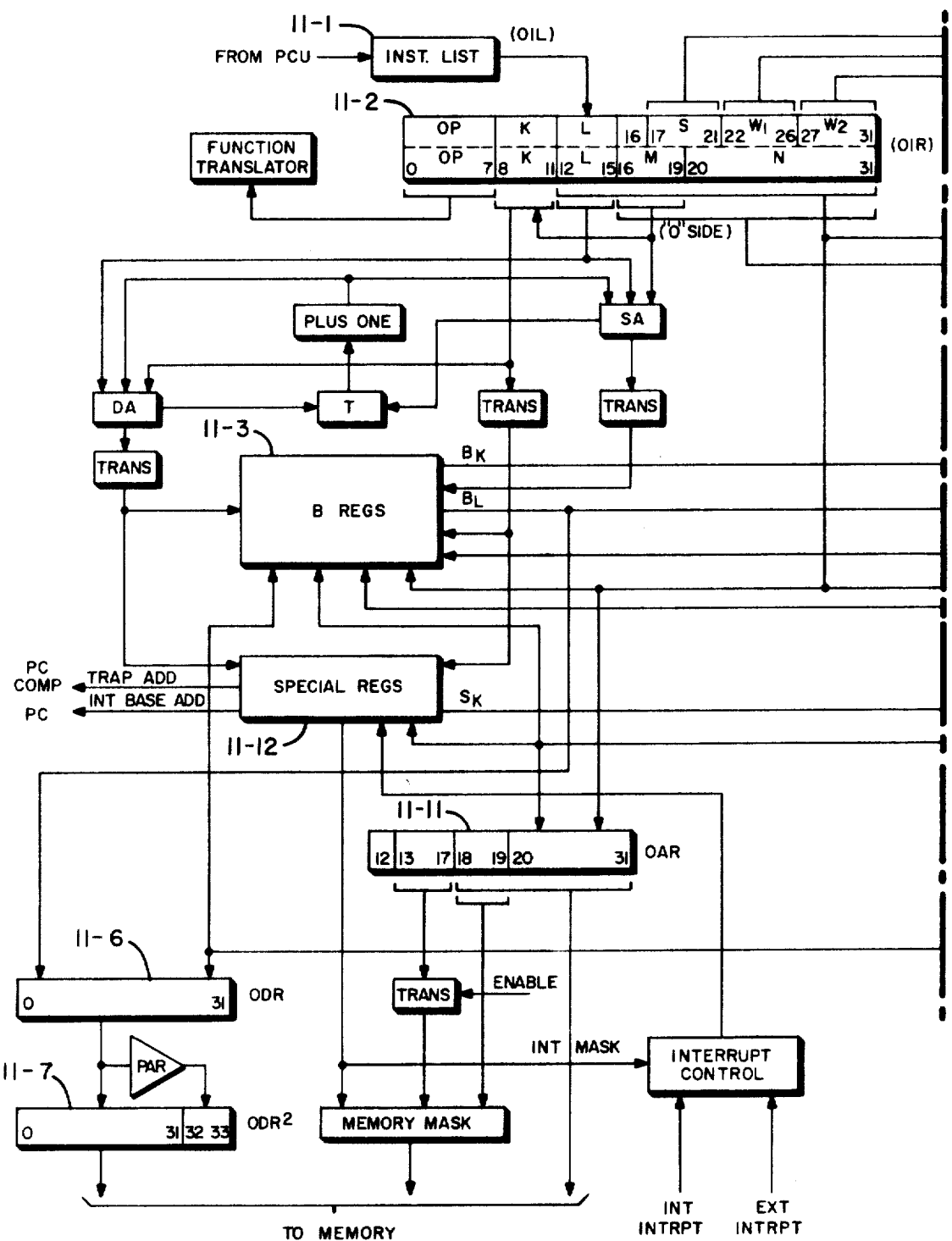

Operand Control Unit (OCU)—FIG. 11

Two major functions are performed by the Operand Control Unit: (1) Accessing memory to fetch and store data; and (2) Data manipulation to relieve the ACU from housekeeping tasks.

Activity goes on within the OCU concurrently with operations in the PCU and ACU. This is made possible by buffering similar to that in ACU. Many instructions are executed entirely within OCU, others transmit data to ACU and still others finish the data transfer started by ACU. The Operand Instruction List 11-1 (OIL) holds 4 instructions and serves the Operand Instruction Register 11-2 (OIR) directly, see also FIG. 2 for a block diagram showing all major registers in this unit. The OCU has 16 addressable registers 11-3 called B-registers. These registers are 32 bits in length and are used for indexing, address modification and temporary storage of data words. The first, called $B_0$, is constrained to contain zeros. A 3-input, 20-bit adder 11-4 is available for address modification, index looping, and some data manipulation. The repertoire of this section includes many conditional jumps, logical operations, and some arithmetic operations. Logical operations are done on 32 bits at a time. Also available in this Unit is the Edit Unit 11-5. This unit is capable of packing or unpacking from 1 to 32 contiguous bits of data. Options in the use of the edit unit allow the first bit of the edited information to be extended as a sign bit and allow the results to be sent to a specified A-register (this requires that the instruction be sent to both ACU and OCU). The principal concern of OCU is fetching and storing of operands. The necessary logic for requesting words from operand memory and storing of data into variable memory is in this section. Two independent paths are available for operand memory requests. A fetch and a store can occur simultaneously as long as the requests go to different memory modules. Two variable memory Output Registers 11-16 and 11-17 and two operand memory Input Registers 11-8 and 11-9 are available for double fetches and double stores. There is also an Input Address Register 11-10 (IAE) and an Output Address Register 11—11 (OAR). Requests for constants from Constant Memory are handled as any other input request but not enough lines are available to write into constant memory directly from the processor. Contained in OCU is a set of special registers 11-12. It includes the Delta Clock Register, the necessary registers for handling interrupts, and registers for lockout control.

Processor instruction repertoire

The machine instructions of the Processor are selected to utilize the organizational design. The number of instructions is not indicative of the Programming capability. Instructions can be separated into four functional classes according to which units are used in their execution.

The functional Clases are:

| Class 1 | Arithmetic instructions | (ACU only). |
|---|---|---|
| Class 2 | Operand instructions | (OCU only). |
| Class 3 | Common instructions | (ACU and OCU). |
| Class 4 | Special instructions | (PCU only, and PCU and ACU or OCU). |

Some of the characteristics of the repertoire are: double indexing, editing (Packing, unpacking and shifts of data in OCU), fixed and floating point arithmetic instructions, and many true (constant included in program instruction word) instructions. Indirect addressing is available.

Two basic lengths are used for processor instruction words: Whole words of 32 bits and half words of 16 bits. True instructions, data fetch and store instructions and jump instructions are the prime users of the whole word formats. Most arithmetic instructions use the half word formats. The various instruction formats are:

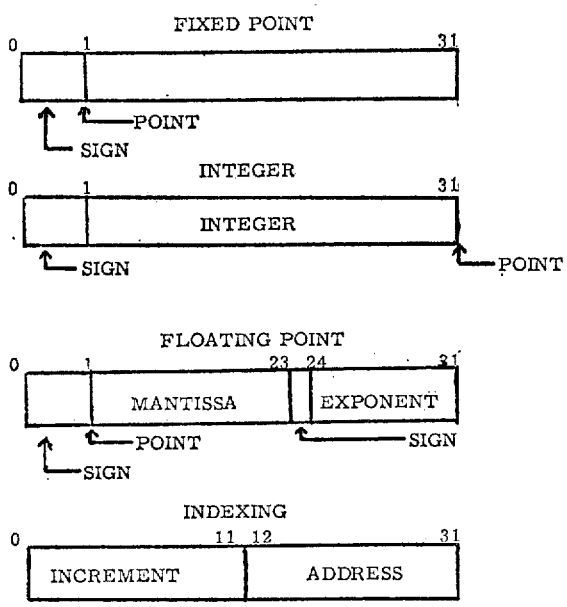

I and J are used to designate A-registers; K, L, and M are used to designate B-registers; S is a shift count; N is a constant; U is an address; W1 and W2 are pointers; P1 and P2 are used for C-register designation and incrementing; and Y is used for special register designation.

The various Data Formats are:

FIXED POINT

INTEGER

FLOATING POINT

INDEXING

Two's complement representation is used for negative values.

For the purposes of this application, only those processor instructions used to program the Take Task sequence and Set Task sequence will be described. The notation used in the Task Control instruction reportoire list to follow, and in the sub-operations for the ACU and OCU as shown in the Appendix, is as follows:

$A_I$—One of the 16 arithmetic registers, 32 bits long, usually used for the first operand in an arithmetic operation $0 \leq \leq 15$.

$A_0$—First of the 16 arithmetic registers which contains the most significant portion of the results of an arithmetic operation, also called the most significant part of the primary arithmetic register.

$A_J$—One of the 16 arithmetic registers usually used for the second operand and in an arithmetic operation, also used for storage of the results of some operations, $0 \leq \leq 15$.

R—A 32-bit register used to contain the least significant portion of the results of an arithmetic instruction, also used with $A_0$ for a double-length register, also called the least significant part of the primary arithmetic register.

AP—The 32-bit most significant part of the secondary arithmetic register.

RP—The 32-bit least significant part of the secondary arithmetic register.

M—The 32-bit register used to hold one input to the adder of the ACU, the multiplicant, or the divisor.

(D)—The content of register D, where D may be any register.

$(D)_{(a-b)}$—The content of bit positions A through b of register D.

(D,E)—The content of the double length register made up of registers D and E.

D,E—The double length register made up of registers D and E.

$D_{(a-b)}$, $E_{(c-d)}$—The bit positions $a$ through $b$ of register D, with bit positions $c$ through $d$ of register E.

$(D_{(a-b)}, E_{(c-d)})$—The content of bit positions $a$ through $b$ of register D, and bit positions $c$ through $d$ of register E.

$D_{(e)}$—The bit positions 24 through 31 of register D which hold the exponent in floating point operations.

$D_{(m)}$—The bit positions 0 through 23 of register D, which hold the mantissa in floating point operations.

$(D)_{(e)}$—The content of the exponent bits of register D.
$(D)_{(m)}$—The content of the mantissa bits of register D.

$B_K$—One of the 16 32-bit registers used for indexing and data manipulation in the OCU.

$B_{(a)}$—The bit positions 12 through 31 of a register B, which hold the address or the index for address modification.

$(B)_{(a)}$—The content of the address bits of a register B.

$B_{(i)}$—The bit positions 0 through 11 of a register B, which hold the increment in indexing operations.

$(B)_{(i)}$—The content of the increment bits of a register B.

N—A constant
U—A constant Address
S. Sel.—Shift Selector

∪—The operation of finding the logical OR of two operands, where the result bit is a 1 if either operand or both operands have a 1 in the corresponding bit position.

∩—The operation of finding the logical AND of two operands, where the result bit is a 1 if and only if both operands have a 1 in the corresponding bit location.

⊕—Add without carry.
PC—Program Counter
IAR—Input Address Register
OAR—Output Address Register
IDR—Input Data Register
ODR—Output Data Register
→—Transfer The following is a list of instructions for the system of FIGS. 5 through 11 which are combined in various ways for the purpose of task control. Reference may also be made to the Appendix which gives the number and sequence of the actual information transfers and manipulations needed to excute each instruction.

wants to prevent other processing units from using a task table during the time it is updating the table. This instruction sends the contents of the specified memory location to the specified B-register, but on the restore cycle the memory bit positions 0 and 1 are changed (biased) to 1. To use this instruction for functional lock-

TASK CONTROL INSTRUCTION REPERTOIRE

| Format | Function | Operation |
|---|---|---|
| ABAT, K, L, N | Add B Address True | The last 16 bits N of the instruction word are added to $(B_K)_{(a)}$ with the sum replacing $(B_L)_{(a)}$. |
| EDTI, K, L, S, W1, W2 | Edit and Insert | The $(B_K)$ are rotated right (right end around) S bit positions. The new quantity is then edited so that the bits W1 through W2 of the shifted register are inserted into bits W1 through W2 of $B_L$, with the remainder of $B_L$ unchanged. W1 must be less than W2. |
| EDTS, K, L, S, W1, W2 | Edit and Store | The $(B_K)$ are rotated right (right end around) S bit positions. The new quantity is then edited so that the bits on the left of W1 and the bits on the right of W2 are made zero. The edited word replaces $(B_L)$. $(B_K)$ remains at its original value. |
| FBN, K, M, L, U | Fetch and Bias Negative | Data from memory replaces $(B_L)$ and bits 0 and 1 of the memory word are made "ONES". The address of the location is calculated by adding $(B_K)_{(a)}$, $(B_M)_{(a)}$ and the last 12 bits of the instruction word U. |
| FDA, K, M, J, U | Fetch Into A Direct | Data from memory replaces $(A_J)$. The address of the data is calculated by adding $(B_K)_{(a)}$, $(B_M)_{(a)}$ and the last 12 bits of the instruction word U. After the address has been determined and used, the $(B_K)_{(a)}$ is incremented by the amount $(B_K)_{(i)}$. |
| FDB, K, M, L, U | Fetch Into B Direct | Data from memory replaces $(B_L)$. The address of the data is calculated by adding $(B_K)_{(a)}$, $(B_M)_{(a)}$ and the last 12 bits of the instruction word, U. After the address has been determined and used, the $(B_K)_{(a)}$ is incremented by the amount $(B_K)_{(i)}$. |
| IJNN, K, U | Index Jump On B Not Negative | $(B_K)_{(i)}$ is subtracted from $(B_K)_{(a)}$ and the difference placed into $B_{K(a)}$. If $(B_K)_{(a)}$ is now greater than or equal to 0, the last 20 bits, U, of the instruction word are sent to the program counter in order to start a new instruction sequence. |
| JANE, I, U | Conditional Jump If A Not Equal | If I field $=0$ and $(A_0) \neq 0$, or if I field $\neq 0$ and $(A_0) \neq (A_I)$, then the last 20 bits of the instruction word, U, are sent to the program counter in order to start a new instruction sequence. |
| JANG, I, U | Conditional Jump If A Not Greater | If I field $=0$ and $(A_0)$ is equal to or less than 0, or if I field $\neq 0$ and $(A_I)$ is equal to or less than $(A_0)$, then the last 20 bits of the instruction word, U, are sent to the program counter in order to start a new instruction sequence. |
| JBL, K, U | Conditional Jump On B Less Than Zero | If $(B_K)$ is less than zero, then the last 20 bits of the instruction word, U, are sent to the program counter in order to start a new instruction sequence. |
| JBNL, K, U | Conditional Jump on B Not Less Than Zero | If $(B_K)$ is greater than or equal to zero, then the last 20 bits of the instruction word, U, are sent to the program counter in order to start a new instruction sequence. |
| JBNZ, K, U | Conditional Jump on B Not Zero | If $(B_K) \neq 0$, then the last 20 bits of the instruction word, U, are sent to the program counter in order to start a new instruction sequence. |
| LANR, I, J | Logical AND and Replace | Forms the logical AND of $(A_I)$ and $(A_J)$ in $A_0$ and also transmits the result to $A_J$. |
| LBAT, K, N | Load B Address True | The N portion of the instruction word replaces $(B_K)_{(a)}$, and $(B_K)_{(i)}$ is replaced by zeros. |
| LBIT, K, N | Load B Increment True | The last twelve bits 20–31 of the instruction word N field replace $(B_K)_{(i)}$, with $(B_K)_{(a)}$ remaining unchanged. |
| LORR, I, J | Logical OR and Replace | Forms the inclusive OR of the $(A_I)$ and $(A_J)$ in $A_0$ and also transmits the result to $A_J$. |
| MAB, I, L | Move A to B | Replaces $(B_L)$ with $(A_I)$. |
| MBA, K, J | Move B to A | Replaces $(A_J)$ with $(B_K)$. |
| MVA, I, J | Move A | Replaces $(A_J)$ with $(A_I)$. |
| MVB, K, L | Move B | Replaces $(B_L)$ with $(B_K)$. |
| NITR, I, J, N | Logical Integer True and Replace | Forms the logical AND of $(A_I)_{(16-31)}$ and N, with results in $A_0$ and $A_J$. |
| NKB, K | Increment B | $(B_K)_{(i)}$ is added to $(B_K)_{(a)}$ and the sum replaces $(B_K)_{(a)}$. $(B_K)_{(i)}$ remains unchanged. |
| NRM, I, J | Normalize and Replace | "Normalizes" $(A_I)$ or $(A_0, R)$, and stores the result as a floating point number in $A_J$, leaving the shifted number in $A_0$ without the exponent. "Normalize" is the process of shifting the content of the register, left end off, until $(A_0)_{(0)} \neq (A_0)_{(1)}$, or in other words, until the value in bit position 0 of $A_0$ does not equal the value in bit position 1 of $A_0$. |
| NTR, I, J, N | Logical AND True and Replace | Forms the logical AND of $(A_I)_{(0-15)}$ and N, with results in $A_0$ and $A_J$. |
| RJP, K | Return Jump | $(B_K)_{(a)}$ replaces (PC) to provide the address of the next instruction. |
| SBB, K, L | Subtract B | Subtracts $(B_L)_{(a)}$ from $(B_K)_{(a)}$ and replaces $(B_L)_{(a)}$ with the difference. |
| SBX, I, J | Subtract Exponent | Subtracts the exponent of $(A_J)$ from the exponent of $(A_I)$, and places the mantissa of $(A_J)$ with the new exponent into $A_0$. |
| SDA, K, M, J, U | Store From A Direct | $(A_J)$ replaces a data word in memory. The memory address is calculated by adding $(B_K)_{(a)}$, $(B_M)_{(a)}$ and the last 12 bits of the instruction word, U. After the address has been determined and used, $(B_K)_{(a)}$ is incremented by the amount $(B_K)_{(i)}$. |
| SDB, M, L, U | Store From B Direct | $(B_L)$ replaces a data word in memory. The memory address is calculated by adding $(B_K)_{(a)}$, $(B_M)_{(a)}$ and the last twelve bits of the instruction word, U. After the address has been determined and used, the $(B_K)_{(a)}$ is incremented by the amount $(B_K)_{(i)}$. |
| SHL, S | Left Shift | Shifts $(A_0)$ or $(A_0, R)$ left the number of places given by S. |
| SHR, S | Right Shift | Shifts $(A_0)$ or $(A_0, R)$ right the number of places given by S. |
| SITR, I, J, N | Subtract A Integer True and Replace | The last 16 bits of the instruction word, N, are subtracted from $(A_I)_{(16-31)}$, and the result placed into both $A_0$ and $A_J$. |
| SRI, I | Right Shift Indirect | Shifts $(A_0)$ or $(A_0, R)$ right the number of places given by the code in the rightmost 8 bits of $A_I$. |
| UCJ, U | Unconditional Jump | The last 20 bits of the instruction word, U, are sent to the program counter in order to start a new instruction sequence. |

Functional lockout control

A special function, Fetch and Bias Negative (FBN in above table) to be implemented is the ability of a processor or I/O Controller to prevent other units from performing some function that it is currently using. An example of a use for this function is a processor that out, the system assigns a memory location as a control word for the function. Any processor desiring to use of perform the function does a Fetch and Bias negative of this control word. It then does a test of the content of the B-register which received the data to see if the control word was already negative at the time it was fetched, If bits 0 and 1 are both 1's the processor realizes the function is in use by another processor or I-O controller which has not as yet released the function by a normal memory store of the control word with bits 0 and 1 set to 0. It should be noted that in the unlocked state, the control word should have bits 0 and 1 both 0, or else the Fetch and Bias Negative instruction will store data with a parity error.

Detailed operation of the processor

To detail the overall operation of the Processor it is convenient to follow various types of instructions through the Processor. The memory word is fetched to PCU and stored in the first register of the program input buffer, $IR_0$. When the second input register, $IR_1$, is empty the word is sent from $IR_0$ to $IR_2$. From the second register 32 bits at a time are gated into the Common Register by the selection logic. The content of the second register will also be gated to $IR_2$ after it has been gated to the selector. Before the next word comes to the third register it will go to $IR_3$ thus maintaining two complete words of instructions which have been sequenced to the other processing units to be used for short looping. At the Common Register, CR, a partial translation reveals which unit will process the instruction and reveals if the instruction is a 16-bit or 32-bit instruction. This information tells the selector which 32 bits should next be gated to the Common Register, and tells the gate control how many bits and which unit(s) are needed for processing.

The following outlines will indicate how some typical instructions proceed through the processor. The roman numerals indicate location of the instruction while capital letters indicate operations performed on the instruction. The abbreviations are:

CR—Common Register
AIL—Arithmetic Instruction List
OIL—Operand Instruction List
AIR—Arithmetic Instruction Register
OIR—Operand Instruction Register
PCU—Program Control Unit
ACU—Arithmetic Control Unit
OCU—Operand Control Unit The outlines start when the instruction reaches the Common Register in PCU.

Instruction: FETCH INTO B DIRECT (see also Appendix).
  FDB,K,M,L,U.
I. CR:
  A. Translate; 32 bit instruction performed in OCU.
  B. Gate to OIL.
  C. Free CR.
I OIL: A. Wait until requested by OIR.
III OIR:
  A. Translate.
  B. As soon as possible send $(B_{K(A)})+(B_M)_{(A)}+U \to$ Input Address Register, Request Memory.
  C. $(B_K)_{(A)}+(B_X)_{(1)} \to B_{K(A)}$.
  D. Save $B_L$ address and lockout any function using $B_L$ or circuits needed to complete function then free OIR.
  E. When data is returned from Memory, send data to $B_L$ and clear lockout.
Instruction:
  MOVE A TO B (see also Appendix).
  MAB,I,L.
I CR:
  A. Translate: 16 bit instruction performed in OCU and ACU.
  B. Gate to AIL and OIL.
  C. Free CR.
II AIL and OIL:
  A. Wait in AIL until requested by AIR and OIL until requested by OIR.

III AIR:
  A. Translate.
  B. As soon as circuits are available and space is available in the B-interface buffer, transfer $(A_I)$ to the buffer.
  C. Lockout functions which would effect this operation and free AIR.
  D. Complete transfer and clear lockout.
IV OIR:
  A. Translate.
  B. Record L address and lockout functions using this B-register, free OIR.
  C. As soon as the B-interface buffer is not empty, transfer data to $B_L$.
  D. Complete transfer and clear lockout.
Instruction:
  MOVE B (see also Appendix).
  MVB,K,L.
I CR:
  A. Translate: 16 bit instruction performed in OCU.
  B. GATE to OIL.
  C. Free CR.
II OIL:
  A. Wait until requested by OIR.
III OIR:
  A. Translate.
  B. Start transfer of $(B_K)$ as soon as circuits available, save address L, and lockout function using $B_L$. Free OIR.
  C. Complete transfer to $B_L$ and clear lockout.
Construction:
  UNCONDITIONAL JUMP (See also Appendix).
  UCJ, U.
I CR:
  A. Translate: 32 bit instruction performed in PCU.
  B. Not transmitted to either list.
  C. Send U as next program memory request and wait until data arrives at the input buffer.
  D. Gate Next to CR the 32 bits specified by U.

SAMPLE TASK CONTROL PROGRAMS

In order to understand how the specified multiprocessor system of FIGS. 5 through 11 is actually programmed for Task Control, specific values and memory octal addresses will be assumed for each of the sample Set Task and Take Task sequences next to be described.

Assumed set task conditions

Operand Memory octal address for Take Task Control Flag (TTCF) word=206:

| | B | TT1 FE | TT2 FE | TT3 FE | TT4 FE | TTJ FE |
|---|---|---|---|---|---|---|
| Take Task Control Flag (TTCF) word equals=: | 11 | 00 | 11 | 01 | YY | YY |

Operand Memory octal address for TT3 Take Task Boundaries (TTB) word=342.
TT3 Operand Memory octal Start Address=105 (bit positions 0-15 of TTB).
TT3 Operand Memory octal End Address=120 (bit positions 16-31 of TTB).

Operand Memory octal address for TT3 Task Table Reference Control (TTRC) word=426.
TT3 Operand Memory octal Read Address=105 (bit positions 0-15) of TTRC).
TT3 Operand Memory octal Write Address=120 ((bit positions 16-31 of TTRC.

Operand Memory octal address for a processor Task Table Priority List (TTPL) word=567.
Program Memory octal Task Address=735 (bit positions 0-15 of TTPL).
Task Priority=2 (bit positions 24-31 of TTPL).

Operand Memory octal address for F-Mask word=617.
F-Mask word=10   00   00   00---00.

Program Memory octal address for first instruction of Set Task sequence =10.

It will further be assumed that a particular processor is now executing some (any) current task and has, by conventional program means such as flags or counters, determined that a new task should be requested whose beginning instruction word is stored in program memory octal address 735. The processor then enters the Set Task sequence by executing a Subroutine Jump Instruction which is not itself part of the Set Task sequence. This instruction "parks" the current program instruction address in an index register (e.g., $B_{15}$) so that control can be returned thereto at the end of the Set Task sequence, and also sends octal address 10 to the Program Counter so that the first Set Task instruction can be acquired.

3,530,438

| Instruction No. | PM instruction address | \multicolumn{6}{c|}{Set Task Sequence Instruction} | Result |
|---|---|---|---|---|---|---|---|---|
| | | OP | I/K | J/L | N/U/S | W1 | W2 | |
| 1 | 10 | FDB | | 1 | 567 | | | $(B_1)_{(0-15)}=735$ <br> $(B_1)_{(24-31)}=2$ |
| 2 | 11 | EDTI | 0 | 1 | 0 | 0 | 24 | $(B_1)_{(0-24)}=0$ <br> $(B_1)_{(25-31)}=2$ |
| 3 | 12 | FBN | | 2 | 206 | | | $(B_2)=11\ 00\ 11\ 01\ YY\text{--}YY$ |
| 4 | 13 | JBL | 2 | | 152 | | | $(PC)=152$ |

Note: #9 performed after #4 when $(B_2)=00\ YY\ YY\text{---}YY$

| 5 | 152 | LBAT | 7 | | 100 | | | $(B_7)_{(0-11)}=0$ <br> $(B_7)_{(12-31)}=100$ |
| 6 | 153 | LBIT | 7 | | 1 | | | $(B_7)_{(0-11)}=1$ <br> $(B_7)_{(12-31)}=100$ |
| 7 | 154 | IJNN | 7 | | 154 | | | $(B_7)_{(0-11)}=1$ <br> $(B_7)_{(12-31)}=77$ <br> $(PC)=154$ |

Note: Repeat #7 until $(B_7)_{(12-31)}<0$

| 8 | 155 | UJC | | | 12 | | | $(PC)=12$ |

Note: Now repeat #3 and #4

| 9 | 14 | MBA | 1 | 0 | | | | $(A_0)=2$ |
| 10 | 15 | SHL | | | 1 | | | $(A_0)=4$ |
| 11 | 16 | MVA | 0 | 1 | | | | $(A_1)=4$ |
| 12 | 17 | FDA | | 0 | 617 | | | $(A_0)=10\ 00\ 00\text{--}00$ |
| 13 | 20 | SRI | 1 | | | | | $(A_0)=00\ 00\ 10\ 00\text{--}00$ |
| 14 | 21 | MVA | 0 | 3 | | | | $(A_3)=00\ 00\ 10\ 00\text{--}00$ |
| 15 | 22 | MBA | 2 | 2 | | | | $(A_2)=00\ 00\ 11\ 01\ YY\text{--}YY$ |
| 16 | 23 | LANR | 0 | 2 | | | | $(A_0)=00\ 00\ 10\ 00\text{--}00$ <br> $(A_2)=00\ 00\ 10\ 00\text{--}00$ |
| 17 | 24 | JANE | 0 | | 156 | | | $(PC)=156$ |

Note: #20 Performed after #17 when $(A_0)=0$

| 18 | 156 | ABAT | 1 | 1 | 1 | | | $(B_1)=3$ |
| 19 | 157 | UCJ | | | 14 | | | $(PC)=14$ |

Note: Now repeat #9 through #17

| 20 | 25 | MVA | 3 | 0 | | | | $(A_0)=00\ 00\ 00\ 10\ 00\text{--}00$ |
| 21 | 26 | SHR | | | 1 | | | $(A_0)=00\ 00\ 00\ 01\ 00\text{--}00$ |
| 22 | 27 | MBA | 2 | 2 | | | | $(A_2)=00\ 00\ 11\ 01\ YY\text{--}YY$ |
| 23 | 30 | LORR | 0 | 2 | | | | $(A_0)=00\ 00\ 11\ 01\ YY\text{--}YY$ |
| 24 | 31 | FDB | | 3 | 567 | | | $(B_3)_{(0-15)}=735$ <br> $(B_3)_{(25-31)}=2$ |
| 25 | 32 | EDTI | 0 | 3 | 0 | 16 | 31 | $(B_3)_{(0-15)}=735$ <br> $(B_3)_{(16-31)}=0$ |
| 26 | 33 | FDB | 1 | 4 | 423 | | | $(B_4)_{(0-15)}=105$ <br> $(B_4)_{(16-31)}=120$ |
| 27 | 34 | EDTI | 0 | 4 | 0 | 0 | 15 | $(B_4)_{(0-15)}=0$ <br> $(B_4)_{(16-31)}=120$ |
| 28 | 35 | EDTI | 3 | 3 | 16 | 16 | 31 | $(B_3)_{(0-15)}=735$ <br> $(B_3)_{(16-31)}=735$ |
| 29 | 36 | SDB | 4 | 3 | 0 | | | |
| 30 | 37 | ABAT | 4 | 4 | 1 | | | $(B_4)_{(0-15)}=0$ <br> $(B_4)_{(16-31)}=121$ |
| 31 | 40 | MVB | 4 | 6 | | | | $(B_6)_{(0-11)}=0$ <br> $(B_6)_{(16-31)}=121$ |
| 32 | 41 | FDB | 1 | 5 | 423 | | | $(B_5)_{(0-15)}=105$ <br> $(B_5)_{(16-31)}=120$ |
| 33 | 42 | EDTI | 5 | 4 | 0 | 0 | 15 | $(B_4)_{(0-15)}=105$ <br> $(B_4)_{(16-31)}=121$ |
| 34 | 43 | FDB | 1 | 5 | 337 | | | $(B_5)_{(0-15)}=105$ <br> $(B_5)_{(16-31)}=120$ |
| 35 | 44 | EDTI | 0 | 5 | 0 | 0 | 15 | $(B_5)_{(0-15)}=0$ <br> $(B_5)_{(16-31)}=120$ |
| 36 | 45 | SBB | 5 | 6 | | | | $(B_6)_{(0-11)}=0$ <br> $(B_6)_{(12-31)}=-1$ |
| 37 | 46 | JBNL | 6 | | 51 | | | |

Note: #40 performed after #37 when $(B_6)\geq 0$.

| 38 | 47 | FDB | 1 | 5 | 337 | | | $(B_5)_{(0-15)}=105$ <br> $(B_5)_{(16-31)}=120$ |
| 39 | 50 | EDTI | 5 | 4 | 16 | 16 | 31 | $(B_4)_{(0-15)}=105$ <br> $(B_4)_{(16-31)}=105$ |
| 40 | 51 | EDTS | 4 | 5 | 16 | 16 | 31 | $(B_5)_{(0-15)}=0$ <br> $(B_5)_{(16-31)}=105$ |
| 41 | 52 | EDTS | 4 | 6 | 0 | 16 | 31 | $(B_6)_{(0-15)}=0$ <br> $(B_6)_{(16-31)}=105$ |
| 42 | 53 | SBB | 5 | 6 | | | | $(B_6)_{(0-11)}=0$ <br> $(B_6)_{(12-31)}=0$ |
| 43 | 54 | JBNZ | 6 | | 57 | | | |

Note: #46 performed after #43 when $(B_6)\ \S\ 0$

| 44 | 55 | MVA | 3 | 0 | | | | $(A_0)=00\ 00\ 00\ 10\ 00\text{--}00$ |
| 45 | 56 | LORR | 0 | 2 | | | | $(A_0)=00\ 00\ 11\ 11\ YY\text{--}YY$ <br> $(A_2)=00\ 00\ 11\ 11\ YY\text{--}YY$ |
| 46 | 57 | SDB | 1 | 4 | 423 | | | |
| 47 | 60 | SDA | | 2 | 206 | | | |
| 48 | 61 | RJP | 15 | | | | | $(PC)=\text{CURRENT}$ |

Description of set task sequence

1     $OP=FDB;\ L=1;\ U=567$

U holds the correct octal address of a TTPL word since K and M do not specify any B register modification thereof. The TTPL word (octal Task Address=735 and octal Priority=2) is withdrawn from octal location 567 of Operand Memory and placed into $B_1$ since $L=1$. It should be noted that Operand Memory location 567 is reserved to this particular processor for TTPL use. During the execution of its current task, the processor has determined that the task beginning at program memory location 735 should be entered into the task tables for execution with a priority of 2. It has thus stored the assumed TTPL word intermediately at location 567 until now, when it begins the Set Task sequence.

2    $OP=EDTI; K=0; L=1; S=0; W1=0; W2=24$

The $B_0$ value which is always 000 - - 00 is not shifted any places to the right since $S=0$. Unshifted $B_0$ zeros from bit positions 0 through 24 are then placed into bit positions 0 through 24 of $B_1$, thus replacing the Task Address=735 of the TTPL word therein. The octal Priority=2 portion (0000010) remains undisturbed in bit positions 25–31 of $B_1$.

3    $OP=FBN; L=2; U=206$

U holds the correct octal address of the TTCF word since K and M do not specify any B register modification thereof. The TTCF word (11 00 11 01 YY - - - YY) is withdrawn from location 206 of Operand Memory and placed into $B_2$ since $L=2$.

4    $OP=JBL; K=2; U=152$

The sign bit positions 0 and 1 of $B_2$ are now examined. At this time it has been assumed that some other processor is already using the TTCF word. Since they hold 1's, i.e., $(B_2)<0$, the $U=152$ (octal) is sent to the Program Counter in order to make a jump from instruction octal address 13 to octal address 152 in Program Memory.

5    $OP=LBAT; K=7; N=100$

The $N=100$ octal value is placed into bit positions 12–31 of $B_7$, while zeros are placed into bit positions 0–11 of $B_7$.

6    $OP=LBIT; K=7; N=1$

The $N=1$ octal value is placed into bit positions 0–11 of $B_7$ while the 100 octal value in bit positions 12–31 thereof remains unchanged.

7    $OP=IJNN; K=7; U=154$

The octal value of 1 in bit positions 0–11 of $B_7$ is subtracted from the octal value 100 in $B_7$ bit positions 12–31, leaving an octal value of 77 in bit positions 12–31 of $B_7$. Since this difference is greater than 0, the $U=154$ octal address is sent to the Program Counter so that #7 is repeated for the number of times required to make the octal value in bit positions 12–31 of $B_7$ less than 0. When this finally occurs, the instruction address in the Program Counter changes from octal 154 to octal 155 in order to perform #8.

8    $OP=UCJ; U=12$

The $U=12$ octal value is placed into the Program Counter so that #3 and then #4 can once again be executed in order to again check the availability of the TTCF word. If repeated #4 once again finds the sign bits of the TTCF word to be still 1's, then #5, #6, #7, and #8 are again repeated in order to return, after a time delay, to #3 and then #4. This procedure continues until a #4 execution finds 0's in the sign bit positions 0 and 1 of the TTCF word being held in B2, thus specifying that said word is no longer being used by any other processor. This determination prevents the $U=152$ of #4 from being placed into the Program Counter which instead is now permitted to naturally change from octal 13 to octal 14 so as to perform #9 (bypassing or skipping execution of #5, #6, #7, #8). It should further be noted that whenever a TTCF word with sign bits=0 is extracted from Operand Memory octal address 206 during #3, it is automatically restored to said memory address 206 with a sign bits=1 so as to prevent later use of the TTCF word by any other processor.

9    $OP=MBA; K=1; J=0$

The Priority octal value of 2 in $B_1$ is sent to $A_0$.

10    $OP=SHL; S=1$

This shifts the Priority octal value 2(00 - - - - 010) in $A_0$ one place to the left, resulting in a new octal value 4(00 - 0100) now in $A_0$.

11    $OP=MVA; I=0; J=1$

The octal value 4 in $A_0$ is sent to $A_1$.

12    $OP=FDA; J=0; U=617$

U holds the correct octal address of the F-Mask word since K and M do not specify any B register modification thereof. The F-Mask word (10 00 00 00 - - 00) is withdrawn from octal location 617 of Operand Memory and placed into $A_0$.

13    $OP=SRI; I=1$

The original F-Mask word (10 00 00 00 - 00) in $A_0$ is now shifted right 4 places as specified by the octal value 4 held in $A_1$. Thus, the new bit values in $A_0$ are 00 00 10 00 - - 00.

14    $OP=MVA; I=0; J=3$

The shifted F-Mask word 00 00 10 00 - - 00 in $A_0$ is sent to $A_3$ for later use during #20. $A_0$ still retains the same value.

15    $OP=MBA; K=2; J=2$

The TTCF word in $B_2$ (00 00 11 01 $YY$ - - $YY$) is sent to $A_2$.

16    $OP=LANR; I=0; J=2$

The bits 00 00 10 00 - - 00 in $A_0$ ($I=0$) are AND'ED with the corresponding position TTCF bits 00 00 11 01 $YY$ - - $YY$ in $A_2$ ($J=2$). Except for $A_0$ bit position 5 which contains 1, all other $A_0$ bit positions contain 0's. Therefore, the result is as placed into $A_0$ and $A_2$ must also contain 0's in all $A_0$ and $A_2$ bit positions except bit position 5 whose value in turn will correspond to the bit position 5 value 1 in the TTCF word. Hence, the result in $A_0$ and in $A_2$=00 00 10 00 - 00.

17    $OP=JANE; I=0; U=156$

Since $I=0$ and the value 00 00 10 00 - - - 00 now in $A_0$ does not equal 0, $U=156$ is transferred to the Program Counter in order to make a jump from instruction octal address 24 to octal address 156 in Program Memory.

18    $OP=ABAT; K=1; L=1; N=1$

The octal value of 1 ($N=1$) is added to the original Priority octal value of 2 in $B_1$ ($K=1$) with the sum octal value 3 then being placed back into $B_1$ ($L=1$).

19    $OP=UCJ; U=14$

The $U=14$ octal value is placed into the Program Counter so that #9 through #17 can be repeated again in that order using the new Priority octal value of 3 (00 - - 00 11) now in $B_1$. Thus, repeated #9 places octal value 3 in $A_0$. Repeated #10 now results in octal value 6 (00 - - - 0110) in $A_0$. Repeated #13 results in a shifted F-Mask word of 00 00 00 10 00 - - - 00 in $A_0$. Repeated #16 results in a value of all 0's (00 00 00 00 00 - - 00) in both $A_0$ and $A_2$, such that the jump condition of $(A_0)\neq0$ is not met from #17. This then prevents the $U=156$ of #17 from being placed into the Program Counter which instead is now permitted to naturally change from octal 24 to octal 25 so as to perform #20 (bypassing or skipping any repeated execution of #18 and #19).

20    $OP=MVA; I=3; J=0$

The shifted F-Mask word bits 00 00 00 10 00 - - 00, which were stored in $A_3$ during repeated #14, are sent to $A_0$.

21     $OP=SHR;\ S=1$

The value 00 00 00 10 00 - - - 00 now in $A_0$ is shifted one place to the right to result in a new $A_0$ value of 00 00 00 01 00 - - - 00.

22     $OP=MBA;\ K=2;\ J=2$

The TTCF word in $B_2$ is sent to $A_2$.

23     $OP=LORR;\ I=0;\ J=2$

Because of the single 1 bit value now in bit position 7 of $A_0$, the bit value (already 1) in bit position 7 of the TTCF word now in $A_2$ is insured to be 1, resulting in a value of 00 00 11 01 YY - - - YY now in both $A_0$ and $A_2$.

24     $OP=FDB;\ L=3;\ U=567$

U holds the correct octal address of the TTPL word (Task Address=735; Priority=2) since the K and M do not specify any B register modification thereof. This TTPL word is withdrawn from octal location 567 of Operand Memory and placed into $B_3$.

25     $OP=EDTI;\ K=0;\ L=3;\ S=0;\ W1=16;\ W2=31$ $B_0$ values, which are always zeros, are not shifted any places to the right since $S=0$. Unshifted $B_0$ zeros from bit positions 16 through 31 are then placed into bit positions 16 through 31 of $B_3$, thus replacing the Priority=2 (octal) of the TTPL word therein. The Task Address =735 (octal) remains undisturbed in bit positions 0–15 of $B_3$.

26     $OP=FDB;\ K=1;\ L=4\ U=423$

U holds the common base octal address of all TTRC words, which is now summed with the advanced Priority octal value of 3 in $B_1$ so as to generate a new octal address of 426. The TTRC word (Read=105; Write =120 for Task Table 3 is withdrawn from the octal location 426 of Operand Memory and placed into $B_4$.

27     $OP=EDTI;\ K=0;\ L=4;\ S=0;\ W1=0;\ W2=15$ $B_0$ zeros are not shifted. $B_0$ zeros from bit positions 0–15 are placed into bit positions 0–15 of $B^4$, thus replacing the Read=105 octal value of the Task Table 3 TTRC word therein. The Write=120 octal value remains undisturbed in bit positions 16–31 of $B_4$.

28     $OP=EDTI;\ K=3;\ L=3;\ S=16;\ W1=16;\ W2=31$

The octal Task Address=735 in bit positions 0–15 of $B_3$ ($K=3$) is shifted right 16 places so as to now be in bit positions 16–31, after which this shifted value is placed into bit positions 16–31 of $B_3$ ($L=3$) so that $B_3$ holds octal 735 in both halves thereof.

29     $OP=SDB;\ K=4;\ L=3;\ U=0$

The Write=120 octal value held in bit positions 16–31 of $B_4$ is added to $U=0$ so as to place the Task Address octal values 735/735 from $B_3$ into octal address 120 of the Operand Memory Task Table 3. The octal value 120 in $B_4$ is not incremented, since there are all 0 values in $B_4$ bit positions 0–11.

30     $OP=ABAT;\ K=4;\ L=4;\ N=1$

The $N=1$ octal value of the instruction word is added to the Write=120 octal value in $B_4$ ($K=4$) and the new Write octal address 121 is put into bit positions 16–31 of $B_4$ ($L=4$).

31     $OP=MVB;\ K=4;\ L=6$

The Write=121 octal value in $B_4$ is sent to $B_6$.

32     $OP=FDB;\ K=1;\ L=5;\ U=423$

U holds the common base octal address of all TTRC words, which is now summed with the advanced priority octal value of 3 in $B_1$ so as to generate a new octal address of 426. The TTRC word (Read=105; Write=120) for Task Table 3 is withdrawn from octal location 426 of Operand Memory and placed into $B_5$.

33 $OP=EDTI;\ K=5;\ L=4;\ S=0;\ W1=0;\ W2=15$

The Read=105 octal value, now in $B_5$ bit positions 0–15, is transferred without shift into bit positions 0–15 of $B_4$. Bit positions 16–31 of $B_4$ already hold the updated Write octal value of 121.

34     $OP=FDB;\ K=1;\ L=5;\ U=337$

U holds the common base octal address 337 of all TTB words, which is now summed with the advanced priority octal value of 3 in $B_1$ so as to generate a new octal address of 342. The TTB word (Start=105; End= 120) for Task Table 3 is withdrawn from location 342 of Operand Memory and placed into $B_5$.

35 $OP=EDTI;\ K=0;\ L=5;\ S=0;\ W1=0;\ W2=15$

Unshifted $B_0$ zeros from bit positions 0–15 are placed into bit positions 0–15 of $B_5$, replacing the Start=105 octal value therein. Unshifted $B_0$ zeroes from bit positions 0–15 are placed into bit positions 0–15 of $B_5$, replacing the Start=105 octal value therein. This leaves only the End octal address 120 in $B_5$.

36     $OP=SBB;\ K=5;\ L=6$

The updated Write octal address of 121, now in bit positions 12–31 of $B_6$, is subtracted from the End=120 octal value now in $B_5$ bit positions 12–31. The negative difference is placed back into bit positions 12–31 of $B_6$.

37     $OP=JBNL;\ K=6;\ U=51$

Since the content of $B_6$ is less than 0, there is no instruction address jump from octal 46 to octal 51. Instead, the Program Counter normally sequences from 46 to 47 in order to perform #38 and then #39.

38     $OP=FDB;\ K=1;\ L=5;\ U=337$

U holds the common base octal address 337 of all TTB words, which is now summed with the advanced priority octal value of 3 in $B_1$ so as to generate a new octal address of 342. The TTB word (Start=105; End= 120) for Task Table 3 is withdrawn from octal location 342 of Operand Memory and placed into $B_5$.

39 $OP=EDTI;\ K=5;\ L=4;\ S=16;\ W1=16;\ W2=31$

The values in $B_5$ ($K=5$) are shifted right by 16 places ($S=16$) so as to put the Start octal address 105 into bit positions 16–31 of $B_4$, leaving the Read octal address 105 still in positions 0–15 of $B_4$.

40 $OP=EDTS;\ K=4;\ L=5;\ S=16;\ W1=16;\ W2=31$

The 105/105 octal values (New TTRC word for Task Table 3) in $B_4$ ($K=4$) are shifted right by 16 places so that the Read=105 octal value is now in bit positions 16–31. All shifted bits to the left of $W1=16$ and right of $W2=31$ are now made 0, and the entire new number 0/105 is entered into $B_5$ so that the Read octal address 105 occupies bit positions 16–31 thereof.

41 $OP=EDTS;\ K=4;\ L=6;\ S=0;\ W1=16;\ W2=31$

The 105/105 values in $B_4$ are not shifted this time because $S=0$. All bits to the left of $W1=16$ and right of $W2=31$ now are made 0, and the entire new number 0/105 is entered into $B_6$ so that the new Write octal address 105 occupies bit positions 16–31 thereof.

42     $OP=SBB;\ K=5;\ L=6$

The new Write octal address of 105, now in bit positions 12–31 of $B_6$, is subtracted from the Read=105 octal value now in $B_5$ bit positions 12–31. The 0 difference is placed back into bit positions 12–31 of $B_6$.

43     $OP=JBNZ;\ K=6;\ U=57$

Since the content of $B_6$ is equal to 0, there is no instruction address jump from octal 54 to octal 57. Instead, the Program Counter normally sequences from 54 to 55 in order to perform #44 and then #45.

44     $OP=MVA;\ I=3;\ J=0$

The shifted F-Mask bits (00 00 00 10 00 -- 00) in $A_3$ are moved to $A_0$.

45   OP=LORR; I=0; J=2

The shifted F-Mask word (00 00 00 10 00__00) in $A_0$ is OR'ED with the new TTCF word (00 00 11 01 YY -- YY) in $A_2$ so as to place the final updated TTCF word (00 00 11 11 YY -- YY) into $A_0$ and $A_2$.

46   OP=SDB; K=1; L=4; U=423

The advanced Priority octal value of 3 held in $B_1$ is added to U=423 (octal) so as to place the updated Task Table TTRC word (Read=105; Write=105) from $B_4$ into octal address 426 of the Operand Memory.

47   OP=SDA; J=2; U=206

The updated TTCF word (00 00 11 11 YY -- YY) from $A_2$ is stored into U=206 octal address of Operand Memory. After this step, any other processor is able to utilize the TTCF word whose Busy bits 1 and 0 are now 00.

48   OP=RJP; K=15

Program control is now restored to the current task, the running address of which was parked or saved in $B_{15}$ prior to the start of the Set Task sequence.

Assumed take task conditions

Operand Memory address for Take Task Control Flag word=206.

| | TT1 B | TT2 FE | TT3 FE | TT4 FE | TTJ FE |
|---|---|---|---|---|---|

Take Task Control Flag word equals

| 11 | 00 | 01 | 11 | YY -- YY |
|---|---|---|---|---|

Operand Memory address for TT2 Take Task Boundaries word=341.
TT2 Operand Memory Start Address=602 (bit positions 0-15 of TTB).
TT2 Operand Memory End Address=614 (bit positions) 16-31 of TTB).

Operand Memory address for TT2 Task Table Reference Control word=425.
TT3 Operand Memory Read Address=614 (bit positions 0-15 of TTRC).
TT3 Operand Memory Write Address=602 (bit positions 16-31 of TTRC).

Operand Memory address for F-Mask word=636.
F-Mask word=00 01 01 01 -- 01.

Operand Memory address for Clear Flag Mask word=650.
Clear Flag Mask word=00 11 11 11 --- 11.

| No. | PM Instr. Addr. | OP | I/K | J/L | N/U/S | W1 | W2 | Result |
|---|---|---|---|---|---|---|---|---|
| | | | Take Task Sequence Instruction | | | | | |
| 1 | 70 | FBN | | 1 | 206 | | | $(B_1)$=11 00 01 11 YY -- YY |
| 2 | 71 | JBL | 1 | | 202 | | | |

Note: #7 performed after #2 when $(B_1)$=00 YY YY -- YY

| 3 | 202 | LBAT | 7 | | 100 | | | $\{(B_7)_{(0-11)}=0$; $(B_7)_{(12-31)}=100\}$ |
| 4 | 203 | LBIT | 7 | | 1 | | | $\{(B_7)_{(0-11)}=1$; $(B_7)_{(12-31)}=100\}$ |
| 5 | 204 | IJNN | 7 | | 204 | | | $\{(B_7)_{(0-11)}=1$; $(B_7)_{(12-31)}=77\}$ |

Note: Repeat #5 until $(B_7)_{(12-31)}$ <0

| 6 | 205 | UCJ | | | 70 | | | |

Note: Now repeat #1 and #2.

| 7 | 72 | MBA | 1 | 1 | | | | $(A_1)$=00 00 01 11 YY -- YY |
| 8 | 73 | FDA | | 2 | 636 | | | $(A_2)$=00 01 01 01 -- 01 |
| 9 | 74 | LANR | 1 | 2 | | | | $\{(A_0)$=00 00 01 01 0Y -- 0Y; $(A_2)$=00 00 01 01 0Y -- 0Y$\}$ |
| 10 | 75 | NRM | 2 | 3 | | | | $\{(A_0)$=01 01 0Y -- 0Y 00 00; $(A_3)_{(0-23)}$=01 01 0Y -- 0Y; $(A_3)_{(24-31)}$=11 11 11 00$\}$ |
| 11 | 76 | NITR | 3 | 3 | 377 | | | $\{(A_0)_{(0-15)}$=01 01 0Y -- 0Y; $(A_0)_{(16-31)}$=0 -- 0 11 11 11 00; $(A_3)_{(0-15)}$=01 01 0Y -- 0Y; $(A_3)_{(16-31)}$=0 -- 0 11 11 11 00$\}$ |
| 12 | 77 | NTR | 3 | 3 | 0 | | | $\{(A_0)_{(0-23)}$=0; $(A_0)_{(24-31)}$=11 11 11 00; $(A_3)_{(0-23)}$=0; $(A_3)_{(24-31)}$=11 11 11 00$\}$ |
| 13 | 100 | MBA | 0 | 10 | | | | $(A_{10})$=0 |
| 14 | 101 | SBX | 10 | 3 | | | | $\{(A_0)_{(0-23)}$=0; $(A_0)_{(24-31)}$=00 00 01 00$\}$ |
| 15 | 102 | MVA | 0 | 14 | | | | $(A_{14})$=00 -- 0 01 00 |
| 16 | 103 | SITR | 14 | 13 | 1 | | | $\{(A_0)$=00 -- 0 00 11; $(A_{13})$=00 -- 0 00 00 11$\}$ |
| 17 | 104 | FDA | | 0 | 650 | | | $(A_0)$=00 11 11 11 -- 11 |
| 18 | 105 | SRI | 13 | | | | | $(A_0)$=00 00 01 00 -- 11 |
| 19 | 106 | LANR | 0 | 1 | | | | $\{(A_0)$=00 00 01 11 YY -- YY; $(A_1)$=00 00 01 11 YY -- YY$\}$ |
| 20 | 107 | MVA | 14 | 0 | | | | $(A_0)$=00 --- 0 01 00 |
| 21 | 110 | SHR | | | 1 | | | $(A_0)$=2 |
| 22 | 111 | MAB | 0 | 2 | | | | $(B_2)$=2 |
| 23 | 112 | FDA | 2 | 4 | 423 | | | $\{(A_4)_{(0-15)}$=614; $(A_4)_{(16-31)}$=602$\}$ |
| 24 | 113 | NITR | 4 | 5 | 0 | | | $\{(A_0)_{(0-15)}$=614; $(A_0)_{(16-31)}$=0; $(A_5)_{(0-15)}$=614; $(A_5)_{(16-31)}$=0$\}$ |
| 25 | 114 | SHR | | | 16 | | | $\{(A_0)_{(0-15)}$=0; $(A_0)_{(16-31)}$=614$\}$ |
| 26 | 115 | MAB | 0 | 3 | | | | $\{(B_3)_{(0-15)}$=0; $(B_3)_{(16-31)}$=614$\}$ |
| 27 | 116 | LBIT | 3 | | 1 | | | $\{(B_3)_{(0-11)}$=1; $(B_3)_{(12-31)}$=614$\}$ |
| 28 | 117 | MVB | 3 | 4 | | | | $\{(B_4)_{(0-11)}$=1; $(B_4)_{(12-31)}$=614$\}$ |
| 29 | 120 | NKB | 3 | | | | | $\{(B_3)_{(0-11)}$=1; $(B_3)_{(12-31)}$=615$\}$ |
| 30 | 121 | MBA | 3 | 7 | | | | $\{(A_7)_{(0-11)}$=1; $(A_7)_{(12-31)}$=615$\}$ |
| 31 | 122 | NTR | 7 | 7 | 0 | | | $\{(A_0)_{(0-15)}$=0; $(A_0)_{(16-31)}$=615$\}$ |
| 32 | 123 | MAB | 4 | 6 | | | | $\{(B_7)_{(0-15)}$=0; $(B_7)_{(16-31)}$=615; $(B_6)_{(0-15)}$=614; $(B_6)_{(16-31)}$=602$\}$ |

| No. | PM Instr. Addr. | Take Task Sequence Instruction | | | | | | Result |
|---|---|---|---|---|---|---|---|---|
| | | OP | I/K | J/L | N/U/S | W1 | W2 | |
| | | | | Note: Now repeat #1 and #2. | | | | |
| 33 | 124 | EDTI | 3 | 6 | 16 | 0 | 15 | $(B_6)_{(0-15)}=615$<br>$(B_6)_{(16-31)}=602$ |
| 34 | 125 | FDA | 2 | 5 | 337 | | | $(A_5)_{(0-15)}=602$<br>$(A_5)_{(16-31)}=614$ |
| 35 | 126 | NTR | 5 | 6 | 0 | | | $(A_0)_{(0-15)}=0$<br>$(A_0)_{(16-31)}=614$<br>$(A_6)_{(0-15)}=0$<br>$(A_6)_{(16-31)}=614$ |
| 36 | 127 | JANG | 7 | | 133 | | | |
| | | Note: #40 performed after #36 when $(A_7) \leq (A_0)$ | | | | | | |
| 37 | 130 | FDB | 2 | 5 | 337 | | | $(B_5)_{(0-15)}=602$<br>$(B_5)_{(16-31)}=614$ |
| 38 | 131 | FDB | 2 | 6 | 423 | | | $(B_6)_{(0-15)}=614$<br>$(B_6)_{(16-31)}=602$ |
| 39 | 132 | EDTI | 5 | 6 | 0 | 0 | 15 | $(B_6)_{(0-15)}=602$<br>$(B_6)_{(16-31)}=602$ |
| 40 | 133 | MBA | 6 | 7 | | | | $(A_7)_{(0-15)}=602$<br>$(A_7)_{(16-31)}=602$ |
| 41 | 134 | NITR | 7 | 7 | 0 | | | $(A_0)_{(0-15)}=602$<br>$(A_0)_{(16-31)}=0$<br>$(A_7)_{(0-15)}=602$<br>$(A_7)_{(16-31)}=0$ |
| 42 | 135 | SIIR | | | 16 | | | $(A_0)_{(0-15)}=0$<br>$(A_0)_{(16-31)}=602$ |
| 43 | 136 | MVA | 0 | 7 | | | | $(A_7)_{(0-15)}=0$<br>$(A_7)_{(16-31)}=602$ |
| 44 | 137 | NTR | 4 | 5 | 0 | | | $(A_0)_{(0-15)}=0$<br>$(A_0)_{(16-31)}=602$<br>$(A_5)_{(0-15)}=0$<br>$(A_5)_{(16-31)}=602$ |
| 45 | 140 | JANE | 7 | | 144 | | | |
| | | Note: #49 performed after #45 if $(A_0) \neq (A_7)$ | | | | | | |
| 46 | 141 | FDA | | 0 | 650 | | | $(A_0)=00\ 11\ 11\ 11\ --\ 11$ |
| 47 | 142 | SRI | 14 | | | | | $(A_0)=00\ 00\ 00\ 11\ --\ 11$ |
| 48 | 143 | LANR | 0 | 1 | | | | $(A_0)=00\ 00\ 00\ 11\ YY--YY$<br>$(A_1)=00\ 00\ 00\ 11\ YY--YY$ |
| 49 | 144 | SDA | | 1 | 206 | | | |
| 50 | 145 | LBAT | 10 | | 70 | | | $(B_{10})_{(0-11)}=0$<br>$(B_{10})_{(12-31)}=70$ |
| 51 | 146 | FDB | 4 | 6 | 0 | | | $(B_6)=3,206$ |
| 52 | 147 | RJP | 6 | | | | | $(PC)=3,206$ |

Description of take task sequence

1        $OP=FBN; L=1; U=206$

The U field holds the correct Operand Memory octal address 206 of the TTCF word (11 00 01 11 YY --- YY)

The K and M fields do not call for any B register modification of the U field address. Operand Memory is referenced for the TTCF word which in turn is placed into $B_1$ as specified by the L field. During the memory restore time, bit positions 0 and 1 of the restored TTCF word are automatically changed to 1's if not already of this value.

2        $OP=JBL; K=1; U=202$

The U field holds the octal address 202 of the first instruction LBAT (#3) of a delay subroutine. The TTCF word in $B_1$, as specified by the K field, is tested for 1's in bit positions 0 and 1. Since such are found (indicating a Busy signal), the U field address 202 is sent to the Program Counter so that the delay subroutine, comprised of #3, #4, #5, and #6, may be entered.

3        $OP=IBAT; KK=7; N=100$

The $N=100$ octal value is placed into bit positions 12–31 of $B_7$, while zeros are placed into bit positions 0–11 of $B_7$.

4        $OP=LBIT; K=7; N=1$

The $N=1$ octal value is placed into bit positions 0–11 of $B_7$, while the 100 value in $B_7$ bit positions 12–31 remains unchanged.

5        $OP=IJNN; K=7; U=204$

The octal value of 1 in bit positions 0–11 of $B_7$ is subtracted from the octal value 100 in bit positions 12–31, leaving an octal value of 77 in bit positions 12–31 of $B_7$. Since this difference is greater than 0, the $U=204$ octal address is sent to the Program Counter so that #5 is repeated for the number of times required to make the value in bit positions 12–31 of $B_7$ less than 0. When this finally occurs, the Program Memory octal address in the Program Counter changes to 205 in order to perform #6.

6        $OP=UCJ; U=70$

The $U=70$ octal value is placed into the Program Counter so that #1 and then #2 can once more be executed in order to again check the availability of the TTCF word. If repeated #2 again finds the sign bits of the TTCF word to still be 1's, then #3, #4, #5, and #6 are again repeated in order to return, after a time delay, to #1 and then #2. This procedure continues until a #2 execution finds 0's in the sign bit positions 0 and 1 of the TTCF word being held in $B_1$. This determination prevents the $U=202$ of #2 from being placed into the Program Counter, which instead is now permitted to naturally change from 71 to 72 so as to perform #7 (bypassing or skipping execution of #3, #4, #5, and #6). It should further be noted that whenever a TTCF word with sign bits=00 is extracted from Operand Memory octal address 206 during #1, it is automatically restored to said memory address 206 with sign bits=11 so as to prevent later use of the TTCF word by any other processor.

7        $OP=MBA; K=1; J=1$

The TTCF word (00 00 01 11 YY --- YY) is moved from $B_1$ ($K=1$) to $A_1$ ($J=1$).

8        $OP=FDA; J=2; U=636$

The U field holds the correct octal address 636 of an F-Mask word 00 01 01 01 01 --- 01. The K and M fields do not call for any B register modification of the U field address. Operand Memory is referenced for the F-Mask word which is placed into $A_2$ as specified by the J field.

9         $OP=LANR; I=1; J=2$

The TTCF word (00 00 01 11 YY - - - YY) in $A_1$ is logically AND'ED with the F-Mask word (00 01 01 01 01 - - - 01) in $A_2$ ($J=2$) so that the result in both $A_0$ and $A_2$ is a modified TTCF word (00 00 01 01 0Y - - - 0Y) whose sign bits and F flag bits are all 0's, but whose E flag bits remain as originally derived from memory during #1.

10        $OP=NRM; I=2; J=3$

Since the I field specifies $A_2$ (and hence $I \neq 0$), 0's are forced into R Register, and the modified TTCF word in $A_2$ is sent to $A_0$ (even though $A_0$ already contains said modified word as obtained in #9). This modified TTCF word 00 00 01 01 0Y - - - 0Y in $A_0$ is then normalized by shifting it left four places until unlike values are in bit positions 0 and 1 of $A_0$, while the 2's complement of 4 (the number of shifts taken) is calculated. At the end of #10, $A_0$ therefore holds 01 01 0Y 0Y - - - 0Y 00 00, while bit positions 0–23 of $A_3$ hold the higher order bits of this value (01 01 0Y 0Y - - - 0Y), and bit positions 24–31 of $A_3$ hold 11111100 (i.e., −4), which is the two's complement of the shift count.

11        $OP=NITR; I=3; J=3; N=377$

The right half bit positions 16–31 of $A_3$ ($I=3$), which contain the shift count two's complement value of 11111100 in bit positions 24–31 thereof, are logically AND'ED with an octal value 377 (0000000011111111) carried in the N field. This N field configuration therefore will apply 0 bits against 0Y 0Y - - - 0Y in positions 16–23 of $A_3$, and 1 bits against 11111100 in positions 24–31 of $A_3$. The result of 0000000011111100 is placed back into bit positions 16–31 of $A_3$ (since $J=3$) and also bit positions 16–31 of $A_0$, while bit positions 0–15 of $A_3$ and $A_0$ still retain normalized TTCF word bits 01010Y - - - 0Y.

12        $OP=NTR; I=3; J=3; N=0$

The left half bit positions 0–15 of $A_3$, which contain normalized TTCF word bits 01 01 0Y - - 0Y, are logically AND'ED with all 0 bits in the N field so that the result is all zeros. This result is placed into bit positions 0–15 of $A_3$ (since $J=3$) and $A_0$, while bit positions 24–31 thereof still hold the two's complement of the shaft count value, 11111100.

13        $OP=MBA; K=0; J=10$ $B_0$ ($K=0$) which always contains 0's has its contents moved to $A_{10}$ ($J=10$).

14        $OP=SBX; I=10; J=3$

The two's complement of the shift count held in bit positions 24–31 of $A_3$ ($J=3$) is subtracted from the 0's held in bit positions 24–31 of $A_{10}$ ($I=10$) to thereby place into bit positions 24–31 of $A_0$ the true value 00000100(4) of the shift count, and also to place into bit positions 0–23 of $A_0$ the 0's from bit positions 0–23 of $A_3$.

15        $OP=MVA; I=0; J=14$

The true shift count of 4(00 . . . 0100) is moved from $A_0$ ot $A_{14}$ in preparation for the later updating of the TTCF word.

16        $OP=SITR; I=14; J=13; N=1$

The value $N=1$ is subtracted from the true shift count of 4 in $A_{14}$, and difference of 3(00 - - 00000011) is stored in both $A_0$ and $A_{13}$, in preparation for clearing the F-flag of interest in the TTCF word.

17        $OP=FDA; J=0; U=650$ $U=660$ is the correct Operand Memory octal address of a Clear Flag Mask word (00 11 11 11 - - - 11) which is brought into $A_0$.

18        $OP=SRI; I=13$

Bit positions 24–31 of $A_{13}$ hold a shift code 00 00 00 11 calling for an unrounded and unpadded, end off shift (right) of 3 places of the $A_0$ contents (Clear Flag Mask word), resulting in a new $A_0$ value of 00 00 01 11 - - 11.

19        $OP=LANR; I=0; J=1$

The shifted Clear Flag Mask (00 00 01 11 - - - 11) in $A_0$ is logically AND'ED with the TTCF word (00 00 01 11 YY - - - YY) in $A_1$, with the result (an updated TTCF word 00 00 01 11 YY - - - YY) being placed back into both $A_0$ and $A_1$. It should be noted that #16, #17, #18, #19 always perform an unconditional clearing to 0 of the F-flag bit in the TTCF word which is associated with the task table of interest. In this example, the TTCF F-flag bit position of Task Table 2 is already zero, so no change is evident. Had this F-flag bit been 1, however, it would now be cleared to 0 at the end of #19.

20        $OP=MVA; I=14; J=0$

The true shift count value of 4 in $A_{14}$ is sent to $A_0$.

21        $OP=SHR; S=1$

The true value 00 - - - 0100 (4) of the shift count now in $A_0$ is shifted right 1 place, as specified by the S field, to in effect divide the shift count by 2. The final octal number of 2 (00 - - - 010) in $A_0$ after this shift identifies (is equal to) the number of the loaded Task Table 2, of highest priority.

22        $OP=MAB; I=0; L=2$

The Task Table number 2 in $A_0$ ($I=0$) is sent to $B_2$ ($L=2$).

23        $OP=FDA; K=2; J=4; U=423$

The U field holds the common base octal address 423 for all Task Table Reference Control (TTRC) words, with said base address being added to the Task Table number 2 in $B_2$ to compute the octal address 425 of the specific Task Table 2 TTRC word to be referenced. This TTRC word (Read=614; Write=602) is taken from Operand Memory and put into $A_4$ ($J=4$).

24        $OP=NITR; I=4; J=5; N=0$

The TTRC Write octal address 602, now held in bit positions 16–31 of $A_4$ ($I=4$) is masked out (converted to 0's) by logically AND'ING same with all 0's in the N field. The result, as placed into $A_5$ ($J=5$) and $A_0$, comprises only the Task Table 2 Read address 614 in bit positions 0–15 thereof, and 0's in bit positions 16–31 thereof.

25        $OP=SHR; S=16$

The content 614/0 of $A_0$ is shifted right 16 places ($S=16$) so that the TTRC word Read address 614 is now in bit positions 16–31 of $A_0$.

26        $OP=MAB; I=0; L=3$

The content 0/614 of $A_0$ ($I=0$) is transferred to $B_3$ ($L=3$) so that the Read address 614 is now in bit positions 16–31 of $B_3$.

27        $OP=LBIT; K=3; N=1$

The right 12 bits of $N=000\ 000\ 000\ 001$ (indexing increment) are transferred to bit positions 0–11 of $B_3$ ($K=3$). The TTRC Read Address 614 in bit positions 16–31 of $B_3$ remains unchanged.

28        $OP=MVB; K=3; L=4$

The Read address 614 and indexing increment 1 in $B_3$ are placed into $B_4$. It is from Operand Memory octal address 614 that the processor will later take the Program Memory address (in this example, 3206) of the beginning instruction of its new Task.

29        $OP=NKB; K=3$

The value 1 in bit positions 0–11 of $B_3$ ($K=3$) is added to the Read address 614 in bit positions 12–31 of $B_3$, and the octal sum 615 placed into bit positions 12–31 of $B_3$.

30      $OP=MBA$; $K=3$; $J=7$

The Read=615 octal address in $B_3$, as well as the indexing increment of value 1, are transferred to $A_7$.

31      $OP=NTR$; $I=7$; $J=7$; $N=0$

The $N=0$ bits are AND'ED with the value 1 in bit positions 0–11 of $A_7$, with all 0's being then sent to bit positions 0–15 of $A_0$ and $A_7$, and the updated Read address 615 being placed into bit positions 16–31 of $A_0$ and $A_7$.

32      $OP=MAB$; $I=4$; $L=6$

The original TTRC word (Read=614; Write=602), as still held in $A_4$ (=4), is now transferred to $B_6$.

33      $OP=EDTI$; $K=3$; $L=6$; $S=16$; $W1=0$; $W2=15$

The 1/615 values in $B_3$ are rotated right end around 16 places such that the updated Read address 615 now occupies bit positions 0–15 and is inserted into bit positions 0–15 of $B_6$, thus replacing the original Read=614 therein. Bit positions 16–31 still hold the Write address 602.

34      $OP=FDA$; $K=2$; $J=5$; $U=337$

U holds the common base octal address 337 of all TTB words, which is now summed with the Task Table number 2 in $B_2$ so as to generate a new octal address of 341. The TTB word (Start=602; End=614) for Task Table 2 is withdrawn from location 341 of Operand Memory and placed into $A_5$.

35      $OP=NTR$; $I=5$; $J=6$; $N=0$

The $N=0$ bits are AND'ED with the Start=602 bits now in bit positions 0–15 of $A_5$, putting the 0 bit result in bit positions 0–15 of $A_0$ and $A_6$, and putting the End=614 octal address into bit positions 16–31 of $A_0$ and $A_6$.

36      $OP=JANG$; $I=7$; $U=88$

Since $I \neq 0$, but rather 7, the updated Read address 615 in $A_7$ is compared with the End address in $A_0$. Because 615 is greater than 614, there is no instruction address jump from 127 to 133 (#40), but instead the Program Counter normally sequences to address 130 in order to perform #37.

37      $OP=FDB$; $K=2$; $L=5$; $U=337$

U holds the common base octal address 337 of all TTB words which is now summed with the Task Table number 2 in $B_2$ so as to generate a new address of 341. The TTB word (Start=602; End=614) for Task Table 2 is withdrawn from location 341 of Operand Memory and placed into $B_5$.

38      $OP=FDB$; $K=2$; $L=6$; $U=423$

The U field holds the common base address 423 for all TTRC words, which is now added with the Task Table number 2 in $B_2$ in order to generate address 425. The original TTRC word (Read=614; Write=602) for Task Table 2 is withdrawn from location 425 in Operand Memory and sent to $B_6$.

39 $OP=EDTI$; $K=5$; $L=6$; $S=0$; $W1=0$; $W2=15$

There is no shift of the Start=602 value in bit positions 0–15 of $B_5$. This value is sent into bit positions 0–15 of $B_6$, replacing the Read=614 address therein. The Write address 602 is retained in bit positions 16–31 of $B_6$.

40      $OP=MBA$; $K=6$; $J=7$

The updated TTRC word (Read=602; Write=602) is sent from $B_6$ to $A_7$.

41      $OP=NITR$; $I=7$; $J=7$; $N=0$

The $N=0$ values are AND'ED with the Write address 602 in bit positions 16–31 of $A_7$, with all 0 bits being returned to bit positions 16–31 of $A_0$ and $A_7$. The updated Read Address 602 is also in bit positions 0–15 of $A_0$ and $A_7$.

42      $OP=SHR$; $S=16$

The updated Read value 602 in bit positions 0–15 of $A_0$ is shifted right 16 places so that it occupies bit positions 16–31 thereof.

43      $OP=MVA$; $I=0$; $J=7$

The shifted Read address 602 in $A_0$ is moved to corresponding bit positions 16–31 in $A_7$.

44      $OP=NTR$; $I=4$; $J=5$; $N=0$

The $N=0$ bits are AND'ED with the original Read=614 address in bit positions 0–15 of $A_4$. The 0 bit result is placed into bit positions 0–15 of $A_0$ and $A_5$. Also, the Write address 602 from bit positions 16–31 of $A_4$ is sent to bit positions 16–31 of $A_0$ and $A_5$.

45      $OP=JANE$; $I=7$; $U=144$

Since the updated Read Address 602 in $A_7$ is equal to the Write address 602 in $A_0$, there is no instruction address jump from 140 to 144 (#49). Instead, the Program Counter normally steps from octal address 140 to 141 (#46).

46      $OP=FDA$; $J=0$; $U=650$ $U=650$ is the correct address of the Clear Flag Mask word comprised of bits 00 11 11 11 - - - 11. This word is withdrawn from Operand Memory and sent to $A_0$.

47      $OP=SRI$; $I=14$

The Clear Flag Mask word in $A_0$ is right shifted (sign unpadded, unrounded) four places as specified by the true shift count of 4 (00000100) still held in bit positions 24–31 of $A_{14}$. This makes the content of $A_0=00\ 00\ 00\ 11\ \text{---}\ 11$.

48      $OP=LANR$; $I=0$; $J=1$

The shifted Clear Flag Mask word 00 00 00 11 - - - 11 in $A_0$ is AND'ED with the TTCF word 00 00 01 11 YY - - - YY still held in $A_1$ so that the E Flag for Task Table 2 is cleared to 0. The final updated TTCF word 00 00 00 11 YY - - - YY is placed in both $A_0$ and $A_1$.

49      $OP=SDA$; $J=1$; $U=206$

U holds the correct Operand Memory address of the final updated TTCF word 00 00 00 11 YY - - - YY which is placed therein from $A_1$. It should here be noted that #49 is always performed either following #45 or #48, so that the updated TTCF word now in Operand Memory address 206 has zero Busy bits thus releasing it for use by another processor.

50      $OP=LBAT$; $K=10$; $N=70$

The address 70 of the first Take Task sequence instruction (#1) is placed into bit positions 12–31 of $B_{10}$ while bit positions 0–11 thereof are filled with zeros. Thus, the final instruction of each processor task (other than Set Task and Take Task sequences) is one specifying that the address 70 from $B_{10}$ be sent to the Program Counter so that the Take Task sequence can be entered, i.e., a jump to the Take Task program. This particular technique for entering the Take Task sequence is merely a programmer's option for which various other acceptable alternatives may exist.

51      $OP=FDB$; $K=4$; $L=6$; $U=0$

The Read address 614 in $B_4$ is summed with the $U=0$ value so as to withdraw from Operand Memory location 614 the Program Memory octal address 3206 of the first instruction of the new task to be next performed by the Processor. This Program Memory instruction address 3206 is placed into $B_6$.

52    OP=RJP; K=6

The address 3206 in $B_6$ is sent to the Program Counter for a jump to the beginning instruction of the new task.

While two sample programs have been given for performing the novel take task and set task inventions, it is to be understood that various programming options exist which are available for accomplishing the objectives of this invention. Consequently, many modifications and/or changes may be apparent to those skilled in the art without departing from the novel principles defined in the claims.

APPENDIX

FUNCTION: ADD B ADDRESS TRUE
FORMAT (C): ABAT K L N
OPERATION: $N+(B_K)_{(a)} \rightarrow B_{L(a)}$ $(B_L)_{(1)}$ unchanged
SUBCOMMANDS:
 (1) (a) $OIR_{(12-15)} \rightarrow T$
   (b) $B_{K(12-31)} \rightarrow K_{(12-31)}$
   (c) CLR $K_{(0-11)}$
   (d) $B_{L(0-11)} \rightarrow L_{(0-11)}$
   (e) CLR $L_{(12-31)}$
   (f) $OIR_{(16-31)} \rightarrow E_{(16-31)}$
   (g) CLR $E_{(12-15)}$
 (2) ADDR→D
 (3) (a) $T \rightarrow DA^2$
   (b) D→F
 (4) C $B_L$
 (5) $F \rightarrow B_L$ FUNCTION: EDIT AND INSERT
FORMAT (F): EDTI K L S W1 W2
OPERATION: SHIFT $B_K$ RIGHT END AROUND BY S $$(B_K)_{(W1-W2)}{}^1 \rightarrow B_{L(W1-W2)}$$

$(B_L)_{(0-W1)}$ and $(B_L)_{(W2-31)}$ unchanged

SUBCOMMANDS:
 (1) (a) $OIR_{(12-15)} \rightarrow T$
   (b) $B_K \rightarrow K$
   (c) $B_L \rightarrow L$
   (d) $OIR_{(17-21)} \rightarrow S$
   (e) $OIR_{(22-26)} \rightarrow PL$
   (f) $OIR_{(27-31)} \rightarrow PR$
 (2) E/S→D
 (3) (a) $T \rightarrow DA^{2\prime}$
   (b) D→F
 (4) CLR $B_L$
 (5) $F \rightarrow B_L$ FUNCTION: EDIT AND STORE
FORMAT (F): EDTS K L S W1 W2
OPERATION: SHIFT $B_K$ RIGHT END AROUND BY S $$(B_K)_{(W1-W2)}{}^2 \rightarrow B_{L(W1-W2)}$$

$(B_L)_{(0-W1)}$ and $(B_L)_{(W2-31)}$ SET TO ZERO

SUBCOMMANDS:
 (1) (a) $OIR_{(12-15)} \rightarrow T$
   (b) $B_K \rightarrow K$
   (c) CLR L
   (d) $OIR_{(17-21)} \rightarrow S$
   (e) $OIR_{(22-26)} \rightarrow PL$
   (f) $OIR_{(27-31)} \rightarrow PR$
 (2) E/S→D
 (3) (a) $T \rightarrow DA^2$
   (b) D→F
 (4) CLR $B_L$
 (5) $F \rightarrow B_L$ FUNCTION: FETCH AND BIAS NEGATIVE
FORMAT (E): FBN K $M^3$ L U
OPERATION: $(B_K)_{(a)}+(B_M)_{(a)}+U \rightarrow IAR$; $[(IAR)] \rightarrow B_L$
SUBCOMMANDS:
 (1) (a) $B_{K(12-31)} \rightarrow K_{(12-31)}$
   (b) $B_{M(12-31)} \rightarrow L_{(12-31)}$
   (c) $OIR_{(20-31)} \rightarrow E_{(20-31)}$
   (d) CLR $E_{(12-19)}$
 (2) $OIR_{(16-19)} \rightarrow OIR_{(8-11)}$
 (3) ADDER→D
 (4) (a) $OIR_{(16-19)} \rightarrow DA$
   (b) $D_{(13-17)} \rightarrow IAR_{(13-17)}$
 (5) (a) $D_{(18-31)} \rightarrow IAR_{(13-31)}$
   (b) SEND FETCH REQ.
   (c) $DA \rightarrow DA^0$
WAIT FOR DATA ENABLE
 (6) MEM DATA→$IDR^1$
 (7) $IDR^1 \rightarrow IDR^2$
 (8) $DA^1 \rightarrow DA^2$
 (9) $IDR^2 \rightarrow F$
 (10) CLR $B_L$
 (11) $F \rightarrow B_L$
 (12) MEM DATA→$IDR^1$ ⎫
 (13) $IDR^1 \rightarrow IDR^2$  ⎪
 (14) PLUS ONE→$DA^2$ ⎬ if double
 (15) $IDR^2 \rightarrow F$   ⎪
 (16) CLR $B_{L+1}$  ⎪
 (17) $F \rightarrow B_{L+1}$   ⎭

FUNCTION: FETCH INTO A DIRECT
FORMAT (E): FDA K $M^4$ J U
OPERATION: $B_{K(a)}+(B_M)_{(a)}+U \rightarrow IAR$; $[(IAR)] \rightarrow A_J$
SUBCOMMANDS:
 (1) (a) $B_{K(12-31)} \rightarrow K_{(12-31)}$
   (b) $B_{M(12-31)} \rightarrow L_{(12-31)}$
   (c) $OIR_{(20-31)} \rightarrow E_{(20-31)}$
   (d) CLR $E_{(12-19)}$
 (2) $OIR_{(16-19)} \rightarrow OIR_{(8-11)}$
 (3) ADDER→D
 (4) (a) $OIR_{(8-11)} \rightarrow DA$
   (b) $D_{(13-17)} \rightarrow IAR_{(13-17)}$
 (5) (a) $D_{(18-31)} \rightarrow IAR_{(18-31)}$
   (b) SEND FETCH REQ.
   (c) $DA \rightarrow DA^0$
WAIT FOR DATA ENABLE
 (6) MEM DATA→$IDR^1$
 (7) $IDR^1 \rightarrow IDR^2$
 (8) (a) $IDR^2 \rightarrow$ "B→A buffer"
   (b) MEM DATA→$IDR^1$ ⎫
 (9) $IDR^1 \rightarrow IDR^2$    ⎬ if double
 (10) $IDR^2 \rightarrow$ "B→A buffer" ⎭

FUNCTION: FETCH INTO B DIRECT
FORMAT (E): FDB K $M^5$ L U
OPERATION: $(B_K)_{(a)}+(B_M)_{(a)}+U \rightarrow IAR$; $[(IAR)] \rightarrow B_L$
SUBCOMMANDS:
 (1) (a) $B_{K(12-31)} \rightarrow K_{(12-31)}$
   (b) $B_{M(12-31)} \rightarrow L_{(12-31)}$
   (c) $OIR_{(20-31)} \rightarrow E_{(20-31)}$
   (d) CLR $E_{(12-19)}$
 (2) $OIR_{(16-19)} \rightarrow OIR_{(8-11)}$
 (3) ADDR→D
 (4) (a) $OIR_{(8-11)} \rightarrow DA$
   (b) $D_{(13-17)} \rightarrow IAR_{(13-17)}$
 (5) (a) $D_{(18-31)} \rightarrow IAR_{(18-31)}$
   (b) SEND FETCH REQ.
   (c) $DA \rightarrow DA^0$

---

[1] Indicates those bits of $B_K$ from W1 through W2 inclusive. W1 and W2 are bit position numbers.
[2] Indicates those bits of $B_K$ from W1 through W2 inclusive W1 and W2 are bit position numbers.
[3] The PCU exchanges bits 16–19 and bits 12–15 of the instruction word before placing this instruction in the OCU instruction list.
[4] The PCU exchanges bits 16–19 and bits 12–15 of the instruction word before placing this instruction in the OCI instruction list.
[5] The PCU exchange bits 16–19 and bits 12–15 of the instruction word before placing this instruction in the OCU instruction list.

SUBCOMMANDS:
WAIT FOR DATA ENABLE
(6) MEM DATA→IDR$^1$
(7) IDR$^1$→IDR$^2$
(8) DA$^1$→DA$^2$
(9) IDR$^2$→F
(10) CLR B$_L$
(11) F→B$_L$
(12) MEM DATA→IDR$^1$ ⎫
(13) IDR$^1$→IDR$^2$       ⎪
(14) PLUS ONE→DA$^2$   ⎬ if double
(15) IDR$^2$→F                    ⎪
(16) CLR→B$_{L+1}$            ⎪
(17) F→B$_{L+1}$               ⎭

FUNCTION: INDEX JUMP ON B NOT NEGATIVE [6]
FORMAT (D): IJNN  K  U
OPERATION:

$(B_K)_{(a)} - (B_K)_{(1)} \rightarrow B_{K(a)}$  $(B_K)_{(1)}$ unchanged

U→PC if $(B_K)_{(a)}$ positive

SUBCOMMANDS:
(1) (a) OIR$_{(8-11)}$→T
    (b) B$_K$→K
    (c) B$_{K(0-11)}$→E$_{(20-31)}$
    (d) B$_{K(0)}$→E$_{(12-19)}$
    (e) CLR L
    (f) ENABLE CARRY INTO ADDER
(2) ADDER→D
(3) (a) SIGNAL PCU TO TAKE JUMP IF D POSITIVE
    (b) SIGNAL PCU NOT TO TAKE JUMP IF D NEGATIVE
(4) (a) T→DA$^2$
    (b) D→F
(5) CLR B$_K$
(6) F→B$_K$

FUNCTION: CONDITIONAL JUMP IF A NOT EQUAL
FORMAT (D): JANE  I  U
OPERATION: U→PC IF $I=0$ AND $(A_0)\neq 0$, OR IF $I\neq 0$ and $(A_0)\neq A_I$)
SUBCOMMANDS:
(1) A$_J$$^7$→M
(2) $(A_0)-(M)$→AP
(3) (a) JUMP COMMAND TO PCU IF $(AP)\neq 0$
    (b) NOT JUMP COMMAND TO PCU IF $(AP)=0$
(4) $(A_0)$→AP
FUNCTION: CONDITIONAL JUMP IF A NOT GREATER ---
[6] Negative means—negative decrement $(B_{K(0)}=1)$ and $B_{K(12)}$ went from "1" to "0" or—positive decrement $(B_{K(0)}=0)$ and $B_{K(12)}$ went from "0" to "1."
[7] The instruction format is changed in the Program Control Unit for use by the Arithmetic Unit as follows:
FORMAT:

| JANE | | J | |
|---|---|---|---|
| 0    7 | 8  11 | 12    15 | |

Bit positions 8-11 in the original instruction are placed in bit positions 12-15.
[8] The instruction format is changed in the Program Control Unit for use by the Arithmetic Unit as follows:
FORMAT:

| JANG | | J | |
|---|---|---|---|
| 0    7 | 8  11 | 12  15 | |

Bit positions in the original are placed in bit positions 12-15.

SUBCOMMANDS:
FORMAT (D): JANG  I  U
OPERATION: U→PC IF $I=0$ AND $(A_0)\leq 0$, OR IF $I\neq 0$ AND $(A_I)\leq (A_0)$
SUBCOMMANDS:
(1) A$_J$$^8$→M
(2) $(A_0)-(M)$→AP
(3) (a) JUMP COMMAND TO PCU IF $(AP)\leq 0$
    (b) NOT JUMP COMMAND TO PCU IF $(AP)>0$
(4) $(A_0)$→AP
FUNCTION: CONDITIONAL JUMP ON B LESS THAN ZERO
FORMAT (D): JBL  K  U
OPERATION: U→PC if $(B_K)<0$
SUBCOMMANDS:
(1) B$_K$→K
(2) (a) SIGNAL PCU TO JUMP IF CONDITION IS MET
    (b) SIGNAL PCU NOT TO JUMP IF CONDITION IS NOT MET
FUNCTION: CONDITIONAL JUMP ON B NOT LESS THAN ZERO
FORMAT (D): JBNL  K  U
OPERATION: U→PC if $(B_K)\geq 0$
SUBCOMMANDS:
(1) B$_K$→K
(2) (a) SIGNAL PCU TO JUMP IF CONDITION IS MET
    (b) SIGNAL PCU NOT TO JUMP IF CONDITION IS NOT MET
FUNCTION: FUNCTION CONDITIONAL JUMP ON B NOT ZERO
FORMAT (D): JBNZ  K  U
OPERATION: U→PC f $(B_K)\neq 0$
SUBCOMMANDS:
(1) B$_K$→K
(2) (a) SIGNAL PCU TO JUMP IF CONDITION IS MET
    (b) SIGNAL PCU NOT TO JUMP IF CONDITION IS NOT MET
FUNCTION: LOGICAL AND AND REPLACE
FORMAT (A): LANR  I  J
OPERATION: $(A_I)\cap(A_J)\rightarrow A_0$, A$_J$
SUBCOMMANDS:
(1) (a) I$_{1(12-15)}$→I$_2$
    (b) A$_I$→A$_0$
    (c) A$_J$→M
(2) $(A_0) \cap (M)$→AP
(3) (a) I$_2$→I$_3$
    (b) (AP)→A$_0$
(4) (a) (AP)→L$_A$
    (b) CLR A$_J$
(5) (LA)→A$_J$
FUNCTION: LOAD B ADDRESS TRUE
FORMAT (D): LBAT  K  N
OPERATION: N→B$_{K(a)}$; 0→B$_{K(1)}$
SUBCOMMANDS:
(1) (a) OIR$_{(8-11)}$→T
    (b) CLR K
    (c) CLR L
    (d) OIR$_{(12-31)}$→E
(2) ADDER→D
(3) (a) T→DA$^2$
    (b) D→F
(4) CLR B$_K$
(5) F→B$_K$
FUNCTION: LOAD B INCREMENT TRUE
FORMAT (D): LBIT  K  N
OPERATION: N→B$_{K(1)}$  $(B_K)_{(a)}$ unchanged
SUBCOMMANDS:
(1) (a) OIR$_{(8-11)}$→T
    (b) B$_{K(12-31)}$→K$_{(12-31)}$
    (c) OIR$_{(20-31)}$→K$_{(0-11)}$ SUBCOMMANDS:
    (1) (d) CLR L
        (e) CLR E
    (2) ADDER→D
    (3) (a) T→DA$^2$
        (b) D→F
    (4) CLR→$B_K$
    (5) F→$B_K$
FUNCTION: LOGICAL OR AND REPLACE
FORMAT (A): LORR I J
OPERATION: $(A_I) \cup (A_J)A_0 \to A_J$
SUBCOMMANDS:
    (1) (a) $I_{1(12-15)} \to I_2$
        (b) $A_I \to A_0$
        (c) $A_J \to M$
    (2) $(A_0) \cup (M) \to AP$
    (3) (a) $I_2 \to I_3$
        (b) (AP)→$A_0$
    (4) (AP)→LA
        (b) CLR $A_J$
    5. (LA)→$A_J$
FUNCTION: MOVE A TO B
FORMAT (A): MAB I L
OPERATION: $(A_I) \to B_L$
SUBCOMMANDS:
    (1) (a) $OIR_{(12-15)} \to T$
        (b) "A→B Buffer"→L
        (c) CLR K
        (d) CLR E
    (2) ADDER→D
    (3) (a) T→DA$^2$
        (b) D→F
    (4) CLR $B_L$
    (5) F→$B_L$
FUNCTION: MOVE B TO A
FORMAT (A): MBA K J
OPERATION: $(B_K) \to A_J$
SUBCOMMANDS:
    (1) (a) $B_K \to K$
        (b) CLR L
        (c) CLR E
    (2) ADDER→D
    (3) D→"B→A buffer"
FUNCTION: MOVE A
FORMAT (A): MVA I J
OPERATION: $(A_I) \to A_J$
SUBCOMMANDS:
    (1) $I_{1(12-15)} \to I_3$
    (2) (a) $A_I \to LA$
        (b) CLR $A_J$
    (3) (LA)→$A_J$
FUNCTION: MOVE B
FORMAT (A): MVB K L
OPERATION: $(B_K) \to B_L$
SUBCOMMANDS:
    (1) (a) $OIR_{(12-15)} \to T$
        (b) $B_K \to K$
        (c) CLR L
        (d) CLR E
    (2) ADDER→D
    (3) (a) T→DA$^2$
        (b) D→F
    (4) CLR $B_L$
    (5) F→$B_L$
FUNCTION: LOGICAL AND INTEGER TRUE AND REPLACE
FORMAT (C): NITR I J N
OPERATION:
$$(A_I)_{(16-31)} \cap NA_0 \to A_{J(16-31)}$$
$$(A_I)_{(0-15)} \to A_0, \; A_{J(0-15)}$$
SUBCOMMANDS:
    (1) (a) $I_{1(12-15)} \to I_2$
        (b) $A_I \to A_0$
        (c) $I_{1(16-31)} \to M_{(16-31)}$; 1's→$M_{(0-15)}$ SUBCOMMANDS:
    (2) $(A_0) \cap (M) \to AP$
    (3) (a) $I_2 \to I_3$
        (b) (AP)→$A_0$
    (4) (a) (AP)→LA
        (b) CLR $A_J$
    (5) (LA)→$A_J$
FUNCTION: INCREMENT B
FORMAT (A):

| 0 | NKB | 7 | 8 | K | 11 | 12 | 15 |
|---|---|---|---|---|---|---|---|

OPERATION: $(B_K)_{(a)} + (B_K)_{(1)} \to B_{K(a)} (B_k)_{(1)}$ unchanged
SUBCOMMANDS:
    (1) (a) $OIR_{(8-11)} \to T$
        (b) $B_{K(0-11)} \to E_{(20-31)}$
        (c) $B_{K(0)} \to E_{(12-19)}$
        (d) $B_K \to K$
        (e) CLR L
    (2) ADDER→D
    (3) (a) T→DA$^2$
        (b) D→F
    (4) CLR $B_K$
    (5) F→$B_K$
FUNCTION: NORMALIZE AND REPLACE
FORMAT (A): NRM I J
OPERATION: IF $I = /0$, 0→R and $(A_I) \to A_0$; $(A_0$, R NORMALIZED IN $A_0$,R AND THEN $(A_0)$ AND -(SHIFT COUNT) FORM A FLOATING POINT NUMBER IN $A_J$
SUBCOMMANDS:
    (1) (a) $I_{1(12-15)} \to I_2$
        (b) $A_I \to A_0$; 0→R IF $I \neq 0$
    (2) SHIFT $A_0$, R LEFT UNTIL NORMALIZED
    (3) (a) −SHIFT COUNT $^9 \to M(e)$
        (b) $(A_{0(m)}) \to AP_{(m)}$
    (4) $(M_{(e)}) + 1 \to AP_{(e)}{}^{10}$
    (5) $I_2 \to I_3$
    (6) (a) (AP)→LA
        (b) CLR $A_J$
    (7) $(A_0) \to AP$
    (8) (LA)→$A_J$
FUNCTION: LOGICAL AND TRUE AND REPLACE
FORMAT (C): NTR I J N
OPERATION: $(A_I)_{(0-15)} \cap N \to A_0, \; A_{J(0-15)}$
        $(A_I)_{(16-31)} \to A_0, \; A_{J(16-31)}$
    (1) (a) $I_{1(12-15)} \to I_2$
        (b) $A_I \to A_0$
        (c) $I_{1(16-31)} \to M_{(0-15)}$; 1's→$M_{(16-31)}$
    (2) $(A_0) \cap (M) \to AP$
    (3) (a) $I_2 \to I_3$
        (b) (AP)→$A_0$
    (4) (a) (AP)→LA
        (b) CLR $A_J$
    (5) (LA)→$A_J$
FUNCTION: RETURN JUMP
FORMAT (A):

| 0 | RJP | 7 | 8 | K | 11 | 12 | 15 |
|---|---|---|---|---|---|---|---|

OPERATION: $(B_K)_{(a)} \to PC$
SUBCOMMANDS:
    (1) (a) $B_{K(12-31)} \to K_{(12-31)}$
        (b) CLR L
        (c) CLR E
    (2) ADDER→D
    (3) $D_{(13-31)} \to PCU$
FUNCTION: SUBTRACT B
FORMAT (A): SBB K L
OPERATION: $(B_K)_{(a)} - (B_L)_{(a)}$
        $B_{L(a)} \to (B_L)_{(1)}$ unchanged ---
[9] —Shift count=1's complement of number of shifts.
[10] Two's complement of shift count.

SUBCOMMANDS:
  (1) (a) $OIR_{(12-15)} \rightarrow T$
     (b) $B_{K(12-31)} \rightarrow K_{(12-31)}$
     (c) CLR $K_{0-11}$
     (d) $\overline{B}_{L(12-31)} \rightarrow L_{(12-11)}$
     (e) $B_{L(0-11)} \rightarrow L_{(0-11)}$
     (f) CLR E
     (g) ENABLE CARRY INTO ADDER
  (2) ADDER$\rightarrow$D
  (3) (a) T$\rightarrow$DA[2]
     (b) D$\rightarrow$F
  (4) CLR $B_L$
  (5) F$\rightarrow B_L$

FUNCTION: SUBTRACT EXPONENT
FORMAT (A): SBX I J
OPERATION:

$$(A_I)_{(e)} - (A_J)_e \rightarrow A_{0(e)}$$
$$(A_J)_{(m)} \rightarrow A_{0(m)}$$

SUBCOMMANDS:
  (1) (a) $A_J \rightarrow A_0$
     (b) $A_J \rightarrow M$
  (2) (a) $(A_{0(e)} - (M_{(e)}) \rightarrow AP_{(e)}$
     (b) $(M_{(m)}) + O \rightarrow AP_{(m)}$
  (3) (AP)$\rightarrow A_0$ FUNCTION: STORE FROM A DIRECT
FORMAT (E): SDA K M[11] J U
OPERATION: $(B_K)_{(e)} + (B_M)_{(a)} + U \rightarrow OAR$;
               $(A_J) \rightarrow ODR$
SUBCOMMANDS:
  (1) (a) $B_{K(12-31)} \rightarrow K_{(12-31)}$
     (b) $B_{M(12-31)} \rightarrow L_{(12-31)}$
     (c) $OIR_{(20-31)} \rightarrow E_{(20-31)}$
     (d) CLR $E_{(12-19)}$
  (2) $OIR_{(16-19)} \rightarrow OIR_{(8-11)}$
  (3) ADDER$\rightarrow$D
  (4) (a) $OIR_{(8-11)} \rightarrow DA$
     (b) $D_{(13-19)} \rightarrow OAR_{(13-19)}$
  (5) "A$\rightarrow$B buffer"$\rightarrow ODR^1$
  (6) $ODR^1 \rightarrow ODR^2$
  (7) "A$\rightarrow$B buffer"$\rightarrow ODR^1$} (if double)
  (8) (a) $D_{(18-31)} \rightarrow OAR_{(18-31)}$
     (b) SEND STORE REQ.
        WAIT FOR MEM ACK
  (9) $ODR^1 \rightarrow ODR^2$} (if double)

FUNCTION: STORE FROM B DIRECT
FORMAT (E): SDB[12] K M[13] L U
OPERATION: $(B_K)_{(a)} + (B_M)_{(a)} + U \rightarrow OAR$;
               $(B_L) \rightarrow ODR$
SUBCOMMANDS:
  (1) (a) $B_{K(12-31)} \rightarrow K_{(12-31)}$
     (b) $B_{M(12-31)} \rightarrow L_{(12-31)}$
     (c) $OIR_{(20-31)} \rightarrow E_{(20-31)}$
     (d) CLR $E_{(-21-9)}$
  (2) $OIR_{(16-19)} \rightarrow OIR_{(8-11)}$
  (3) ADDER$\rightarrow$D
  (4) (a) $OIR_{(8-11)} \rightarrow DA$
     (b) $D_{(13-19)} \rightarrow OAR_{(13-19)}$
  (5) $B_L \rightarrow ODR^1$
  (6) $ODR^1 \rightarrow ODR^2$
  (7) $B_{L+1} \rightarrow ODR^1$ (if double)
  (8) (a) $D_{(18-31)} \rightarrow OAR_{(18-31)}$
     (b) SEND STORE REQ.
        WAIT FOR MEM ACK
  (9) $ODR^1 \rightarrow ODR^2$ (if double)

---

[11] The PCU exchanges bits 16–19 and bits 12–15 of the instruction word before placing this instruction in the OCU instruction list.

[12] This could also be the function code for a Store from Z direct.

[13] The PCU exchanges bits 16–19 and bits 12–15 of the instruction word before placing this instruction in the OCU instruction list.

[14] Integer true is always a positive integer.

FUNCTION: LEFT SHIFT
FORMAT (B): SHL S
OPERATION: SHIFTS ($A_0$) OR ($A_0$, R) LEFT THE NUMBER OF PLACES GIVEN BY S.
SUBCOMMANDS:
  (1) $I_{1(8-15)} \rightarrow$ S. Sel.
  (2) SHIFT $A_0$ OR $A_0$, R
  (3) $(A_0) \rightarrow AP$ FUNCTION: RIGHT SHIFT
FORMAT (B): SHR S
OPERATION: SHIFTS ($A_0$) OR ($A_0$, R) RIGHT THE NUMBER OF PLACES GIVEN BY S.
SUBCOMMANDS:
  (1) $I_{1(8-15)} \rightarrow$ S. SEL.
  (2) SHIFT $A_0$ OR $A_0$, R
  (3) $(A_0) \rightarrow AP$ FUNCTION: SUBTRACT A INTEGER TRUE AND REPLACE
FORMAT (C): SITR I J N
OPERATION: $(A_I)_{(16-31)} - N^{14} \rightarrow A_0$, $A_J$
SUBCOMMANDS:
  (1) (a) $I_{1(12-15)} \rightarrow I_2$
     (b) $A_I \rightarrow A_0$
     (c) $I_{1(16-31)} \rightarrow M_{(16-31)}$; $0 \rightarrow M_{(0-15)}$
  (2) $(A_0) - (M) \rightarrow AP$
  (3) (a) $I_2 \rightarrow I_3$
     (b) (AP)$\rightarrow A_0$
  (4) (a) (AP)$\rightarrow$LA
     (b) CLR $A_J$
  (5) (LA)$\rightarrow A_J$

FUNCTION: RIGHT SHIFT INDIRECT
FORMAT (A):

| UCJ | | I | |
|---|---|---|---|
| 0 | 7 | 8  11 | 12  15 |

OPERATION: SHIFT ($A_0$) OR ($A_0$, R) RIGHT THE NUMBER OF PLACES GIVEN BY $(A_I)_{(24-31)}$
SUBCOMMANDS:
  (1) $A_{I(24-31)} \rightarrow$ S. SEL.
  (2) SHIFT $A_0$ OR $A_0$, R
  (3) $(A_0) \rightarrow AP$

FUNCTION: UNCONDITIONAL JUMP
FORMAT (D):

| UCJ | | | U |
|---|---|---|---|
| 0 | 7 | 8  11 | 12  31 |

OPERATION: U$\rightarrow$PC
SUBCOMMAND:
  (1) U$\rightarrow$PC

The embodiments of the invention in which an exclusive property or privilege is claimed are defined as follows:

1. A processor take task executive countrol program for withdrawing a program memory and location address from the task table memory areas of a general purpose data processor apparatus of the type having a program memory area having addressable locations for storing instruction words of different programs, plural task table memory areas to which are assigned different relative priorities and with each area having at least one addressable location which can be filled with a program memory area location address of a beginning instruction word of a program, a control flag memory area for storing data which can identify at least the highest priority task table memory area having such a filled addressable location which has not as yet been sampled, and a reference control memory area having at least one separate addressable location individually assigned to each task table memory area for storing the corresponding task table memory area address of one such filled but unsampled location, said program being a process comprising the following steps, each of which is performed by said processor apparatus:
- (a) ascertaining, from the control flag memory area data, the identification of the highest priority task table memory area in which there is an addressable location filled with an unsampled program memory area location address of a beginning instruction word;
- (b) using said task table memory area identification to acquire, from a correspondingly assigned reference control memory area addressable location, the corresponding task table memory area address of such a filled but unsampled location; and
- (c) sampling the filled task table memory area location, whose address has been acquired, for the program memory area location address of the beginning instruction word of a program.

2. The invention according to claim 1 wherein said process also includes the steps of determining if said identified task table memory area has any other filled but unsampled location, and if not then changing the control flag memory area data to so specify.

3. The invention according to claim 1, wherein said process also includes the step of updating the acquired task table memory area location address which is stored in the correspondingly assigned reference control memory addressable location.

4. The invention according to claim 3 and for use in a processor apparatus in which said last mentioned reference control memory area location also can store the address of a corresponding task table memory area location which in turn is available for receiving a new program area location address, wherein said process also includes the steps of determining if the updated acquired task table memory area location address is equal to the last mentioned task table memory area location address, and if so, then changing the control flag memory area data to specify that the said identified task table memory area has no other unsampled filled location.

5. The invention according to claim 1 and for use in a processor apparatus in which the control flag memory area data comprises a control flag word having a separate first field individually assigned to each task table memory area for storing a first data indication which specifies that the corresponding task table memory area has at least one such filled addressable location which has not as yet been sampled, wherein said first mentioned step of the process includes sequentially examining the separate first fields of the control flag word, beginning with the first field assigned to the highest priority task table memory area, until a said first data indication is found.

6. The invention according to claim 5, wherein said process also includes the steps of determining if said identified task table memory area has any other filled but unsampled location, and if not, then erasing said first data indication from the correspondingly assigned first field of the control flag word.

7. A processor take task executive program for withdrawing a program memory area location address from the task table memory areas of a multiprocessor apparatus of the type wherein each processor has access to the same program memory area having addressable locations for storing instruction words of different programs, to the same plural task table memory areas to which are assigned different relative priorities and with each area having at least one addressable location which can be filled with a program memory area location address of a beginning instruction word of a program, to a same control flag memory area for storing data which both can indicate current use thereof by any processor and can identify at least the highest priority task table memory area having such a filled addressable location which has not as yet been sampled, and to a same reference control memory area having at least one separate addressable location individually assigned to each task table memory area for storing the corresponding task table memory area address of one such filled but unsampled location, said program being a process comprising the following steps, each of which is performed by any of said processor of said multiprocessor apparatus when it needs a new task:
- (a) determining if the control flag memory area data indicates current use thereof by any processor, and if not, then changing the control flag memory area data to indicate current use thereof by the processor;
- (b) ascertaining, from the control flag memory area data, the identification of the highest priority task table memory area in which there is an addressable location filled with an unsampled program memory area location address of a beginning instruction word;
- (c) using said task table memory area identification to acquire, from a correspondingly assigned reference control memory area addressable location, the corresponding task table memory area address of such a filled but unsampled location;
- (d) sampling the filled task table memory area location, whose address has been acquired, for the program memory area location address of the beginning instruction word of a program; and
- (e) finally changing the control flag memory area data to indicate no current use thereof by a processor.

8. The invention according to claim 7 wherein said process also includes the steps of determining if said identified task table memory area has any other filled but unsampled location, and if not, then changing the control flag memory area data to so specify.

9. The invention according to claim 7 wherein said process also includes the step of updating the acquired task table memory area location address which is stored in the correspondingly assigned reference control memory addressable location.

10. The invention according to claim 9 and for use in a multiprocessor apparatus in which said last mentioned reference control memory area location also can store the address of a corresponding task table memory area location which in turn is available for receiving a new program memory area location address, wherein said process also includes the steps of determining if the updated acquired task table memory area location address is equal to the last mentioned task table memory area location address, and if so, then changing the control flag memory area data to specify that the said identified task table memory area has no other unsampled filled location.

11. The invention according to claim 7 and for use in a multiprocessor apparatus in which the control flag memory area data comprises a control flag word having a separate field individually assigned to each task table memory area for storing a first data indication which specifies that the corresponding task table memory area has at least one such filled addressable location which has not as yet been sampled, wherein said identification ascertaining step of the process includes sequentially examining the separate first fields of the control flag word, beginning with the first field assigned to the highest priority task table memory area, until said first data indication is found.

12. The invention according to claim 11 wherein said process also includes the steps of determining if said identified task table memory area has any other filled but unsampled location, and if not, then erasing said first data indication from the correspondingly assigned first field of the control flag word.

13. The invention according to claim 12 and for use in a multiprocessor apparatus in which the control flag word also has a busy field for storing a busy data indication which specifies current use by a processor of the control flag word, wherein said first mentioned steps of the process include examining the busy field of the control flag word to determine if the busy data indication is absent and placing a busy data indication into the busy field, and said final step of the process includes erasing the busy data indication from the busy field of the control flag word.

14. A processor take task executive control program for withdrawing a program memory area location address from the task table memory areas of a general purpose data processor apparatus of the type having a program memory area having addressable locations for storing instruction words of different programs, plural task table memory areas to which are assigned different relative priorities and with each area having at least one addressable location which can be filled with a program memory location address of a beginning instruction word of a program, a control flag memory area for storing data which can identify at least the highest priority task table memory area having such a filled addressable location which has not as yet been sampled, a reference control memory area having at least one separate addressable location individually assigned to each task table memory area for storing the corresponding task table memory area address of one such filled but unsampled location, and a boundary memory area having at least one separate addressable location individually assigned to each task table memory area for storing both the start and end limit addresses of the locations comprising the corresponding task table memory area, said program being a process comprising the following steps each of which is performed by said processor apparatus:
  (a) ascertaining, from the control flag memory area data, the identification of the highest priority task table memory area in which there is an addressable location filled with an unsampled program memory area location address of a beginning instruction word;
  (b) using said task table memory area identification to acquire, from a correspondingly assigned reference control memory area addressable location, the corresponding task table memory area address of such a filled but unsampled location;
  (c) sampling the filled task table memory area location, whose address has been acquired, for the program memory area location address of the beginning instruction word of a program;
  (d) changing the acquired task table memory area location address by a predetermined value; and
  (e) comparing the changed address with one of the start and end limit addresses in the boundary memory area location assigned to the identified task table memory area, in order to determine if said changed address specifies a location not within the identified task table memory area, and if so, then replacing the changed task table memory area location address with the other of said start and end limit addresses.

15. The invention according to claim 14, wherein said process also includes the steps of determining if said identified task table memory area has any other filled but unsampled location, and if not, then changing the control flag memory area data to so specify.

16. The invention according to claim 14 wherein said fourth mentioned step of the process comprises incrementing the acquired task table memory location address, and said fifth mentioned steps comprise determining if said incremented address is larger than said end limit address and if so then replacing the increment acquired address with said start limit address.

17. A processor set task executive control program for storing a program memory area location address of a predetermined priority into the task table memory areas of a general purpose processor apparatus of the type wherein are included a program memory area having addressable locations for storing instruction words of different programs, plural task table memory areas to which are assigned different relative priorities and with each area having at least one addressable location which can be filled with a program memory area location address of a beginning instruction word of a program, a control flag memory area for storing data which can identify each task table memory area having an addressable location available for receiving a new program memory area location address, and a reference control memory area having at least one separate addressable location individually assigned to each task table memory area for storing the corresponding task table memory area address of one such available location, said program being a process comprising the following steps each of which is performed by said processor apparatus when it determines that a task should be performed:
  (a) ascertaining, from the control flag memory data, if the task table memory area identified by the predetermined priority has an available addressable location and, if not, ascertaining the identity of the next highest priority task table memory area having such an available addressable location;
  (b) using said available task table memory area identification to acquire from a correspondingly assigned reference control memory area location, the corresponding task table memory area address of such an available location; and
  (c) storing the program memory area location address into the available corresponding task table memory area location whose address has been acquired.

18. The invention according to claim 17, wherein said process also includes the steps of determining if said identified available task table memory area has any other available location, and if not, then changing the control flag memory area data to so specify.

19. The invention according to claim 17, wherein said process also includes the step of updating the acquired task table memory area location address which is stored in the correspondingly assigned reference control memory addressable location.

20. The invention according to claim 19 and for use in a processor apparatus in which said last mentioned reference control memory area location also can store the address of a corresponding task table memory area location which in turn is already filled with a program memory area location address, wherein said process also includes the steps of determining if the updated acquired task table memory area location address is equal to the last mentioned task table memory area location address, and if so, then changing the control flag memory area data to specify that the said identified task table memory area has no other available location.

21. The invention according to claim 17 and for use in a processor apparatus in which the control flag memory area data comprises a control flag word having a separate first field individually assigned to each task table memory area for storing a first data indication which specifies that the corresponding task table memory area has no available addressable location, wherein said first mentioned step of the process includes sequentially examining the separate first fields of the control flag word, beginning with the first field assigned to the task table memory area identified by the predetermined priority, until no first data indication is found.

22. The invention according to claim 21 wherein said process also includes the steps of determining if said identified available task table memory area has any other available location, and if not, then storing a first data indication in the correspondingly assigned first field of the control flag word.

23. A processor set task executive control program for storing a program memory area location address of a predetermined priority into the task table memory areas of a multiprocessor apparatus of the type wherein each processor has access to a same program memory area having addressable locations for storing instruction words of different programs, to the same plural task table memory areas to which are assigned different relative priorities and with each area having at least one addressable location which can be filled with a program memory area location address of a beginning instruction word of a program, to a same control flag memory area for storing data which both can indicate current use thereof by any processor and can identify each task table memory area having an addressable location available for receiving a new program memory location address, and to a same reference control memory area having at least one separate addressable location individually assigned to each task table memory area for storing the corresponding task table memory area address of one such available location, said program being a process comprising the following steps, each of which is performed by any processor of said multiprocessor apparatus when it determines that a task should be performed:
  (a) determining if the control flag memory area data indicates current use thereof by any processor, and if not, then changing the control flag memory area data to indicate current use thereof by the processor;
  (b) ascertaining, from the control flag memory data, if the task table memory area identified by the predetermined priority has an available addressable location and, if not, ascertaining the identity of the next highest priority task table memory area having such an available addressable location;
  (c) using said available task table memory area identification to acquire, from a correspondingly assigned reference control memory area location, the corresponding task table memory area address of such an available location;
  (d) storing the program memory area location address into the available corresponding task table memory area location whose address has been acquired; and
  (e) finally changing the control flag memory area data to indicate no current use thereof by a processor.

24. The invention according to claim 23 wherein said apparatus also includes the steps of determining if said identified available task table memory area has any other available location, and if not, then changing the control flag memory area data to so specify.

25. The invention according to claim 23, wherein said apparatus also includes the step of updating the acquired task table memory area location address which is stored in the correspondingly assigned reference control memory addressable location.

26. The invention according to claim 25 and for use in a multiprocessor apparatus in which said last mentioned reference control memory area location also can store the address of a corresponding task table memory area location which in turn is already filled with a program memory area location address, wherein said process also includes the steps of determining if the updated acquired task table memory area location address is equal to the last mentioned task table memory area location address, and if so, then changing the control flag memory area data to specify that the said identified task table memory area has no other available location.

27. The invention according to claim 23 and for use in a multiprocessor apparatus in which the control flag memory area data comprises a control flag word having a separate first field individually assigned to each task table memory area for storing a first data indication which specifies that the corresponding task table memory area has no available addressable location, wherein said first mentioned step of the process includes sequentially examining the separate first fields of the control flag word, beginning with first field assigned to the task table memory area identified by the predetermined priority, until no first data indication is found.

28. The invention according to claim 27 wherein said process also includes the steps of determining if said identified available task table memory area has any other available location, and if not, then storing a first data indication in the correspondingly assigned first field of the control flag word.

29. The invention according to claim 28 and for use in a multiprocessor apparatus in which the control flag word also has a busy field for storing a busy data indication which specifies current use by a processor of the control flag word, wherein said first mentioned steps of the process include examining the busy field of the control flag word to determine if the busy data indication is absent and placing a busy data indication into the busy field, and said final step of the process includes erasing the busy data indication from the busy field of the control flag word.

30. A processor set task executive control program for storing a program memory area location address of a predetermined priority into the task table memory areas of a general purpose processor apparatus of the type wherein are included a program memory area having addressable locations for storing instruction words of different programs, plural task table memory areas to which are assigned different relative priorities and with each area having at least one addressable location which can be filled with a program memory area location address of a beginning instruction word of a program, a control flag memory area for storing data which can identify each task table memory area having an addressable location available for receiving a new program memory location address, a reference control memory area having at least one separate addressable location individually assigned to each task table memory area for storing the corresponding task table memory area address of one such available location, and a boundary memory area having at lest one separate addressable location individually assigned to each task table memory area for storing both the start and end limit addresses of the locations comprising the corresponding task table memory area, said program being a process comprising the following steps, each of which is performed by said processor apparatus when it determines that a task should be performed:
  (a) ascertaining, from the control flag memory data, if the task table memory area identified by the predetermined priority has an available addressable location and, if not ascertaining the identity of next highest priority task table memory area having such an available addressable location;
  (b) using said available task table memory area identification to acquire, from a corresponding assigned reference control memory area location, the corresponding task table memory area address of such an available location;
  (c) storing the program memory area location address into the available corresponding task table memory area location whose address has been acquired,
  (d) changing the acquired task table memory area location address by a predetermined value; and
  (e) comparing the changed address with one of the start and end limit addresses in the boundary memory area location assigned to the identified task table memory area, in order to determine if said changed address specifies a location not within the identified task table memory area, and if so, then replacing the changed task table memory area location address with the other of said start and end limit addresses.

31. The invention according to claim 30 wherein said process also includes the steps of determining if said identified available task table memory area has any other available location, and if not, then changing the control flag memory area data to so specify.

32. The invention according to claim 30 wherein said fourth mentioned step of the process comprises incrementing the acquired task table memory location address, and said fifth mentioned steps comprise determining if said incremented address is larger than said end limit address and if so then replacing the incremented acquired address with said start limit address.

33. In a data processing system, the combination comprising:
  (a) a memory means comprising a plurality of memory areas including a program memory area having addressable locations for storing instruction words of different programs, plural task table memory areas to which are assigned different relative priorities and with each area having at least one addressable location which can be filled with a program memory area location address of a beginning instruction word of a program, a control flag memory area for storing data which can identify at least the highest priority task table memory area having such a filled addressable location which has not as yet been sampled, and a reference control memory area having at least one separate addressable location individually assigned to each task table memory area for storing the corresponding task table memory area address of one such filled but unsampled location;

(b) first control means responsive to signals representing the control flag memory area data for producing signals representing the highest priority task table memory area in which there is an addressable location filled with an unsampled program memory area location address of a beginning instruction word;

(c) second control means responsive to said signals representing said task table memory area for reading from a correspondingly assigned reference control memory area addressable location the corresponding task table memory area address of such a filled but unsampled location; and (d) third control means responsive to said address of said filled task table memory area location for reading from said address the program memory area location address of the beginning instruction word of a program.

34. The invention according to claim 33 wherein said first, second and third control means are each part of a programmable group of command generator means which in turn are adapted to respond to a predetermined take task sequence of instructions stored in said program memory area.

35. In a data processing system, the combination comprising:

(a) a memory means comprising a plurality of memory areas including a program memory area having addressable locations for storing instruction words of different programs, plural task table memory areas to which are assigned different relative priorities and with each area having at least one addressable location which can be filled with a program memory area location address of a beginning instruction word of a program, a control flag memory area for storing data which can identify each task, table memory area having an addressable location available for receiving a new program memory area location address, and a reference control memory area having at least one separate addressable location individually assigned to each task table memory area for storing the corresponding task table memory area address of one such available location;

(b) first control means responsive to signals representing the control flag memory data for producing a signal indicating whether the task table memory area identified by the predetermined priority has an available addressable location and if not, producing a signal representing the identity of the next highest priority task table memory area having such an available addressable location;

(c) second control means responsive to said signals representing the identity of said available task table memory area identification for reading from a correspondingly assigned reference control memory area location, the corresponding task table memory area address of such an available location; and (d) third control means for storing the program memory area location address into the available corresponding task table memory area location whose address has been acquired.

36. The invention according to claim 35 wherein said first, second and third control means are each part of a programmable group of command generator means which in turn are adapted to respond to a predetermined set task sequence of instructions stored in said program memory area.

37. A multiprocessor system of the type wherein each processor has access to a common memory means and said memory means includes a program memory area having addressable locations for storing signals representing instruction words of different programs, plural task table memory areas each having addressable locations for storing signals representing program memory area location addresses of beginning instruction words of various tasks, a control flag memory area for storing signals indicating current use of the task tables by any processor and the highest priority task table memory area having a filled addressable location which has not been sampled, and a reference control memory area having a separate addressable location for each task table memory area for storing signals representing the task table memory address of the filled but unsampled location, said system further comprising:

(a) first means for sensing the signals stored in said control flag memory area and producing a first signal if said signals indicate the task table memory areas are not in current use;

(b) second means responsive to said first signal for modifying the signals stored in said control flag memory area to indicate the task table memory areas are in use;

(c) third means responsive to said sensed signals for addressing the reference control memory area address corresponding to the highest priority task table containing a filled addressable location which has not been sampled;

(d) fourth means responsive to the signal stored at said addressed reference control memory address for addressing said filled addressable location to withdraw therefrom signals representing the program memory address of the beginning instruction of a task to be performed by the processor; and, (e) fifth means for modifying the signals stored in said control flag memory area to indicate the task table memory areas are not in use.

38. A multiprocessor system as claimed in claim 37 and further including:

(a) sixth means for determining if the task table memory area from which said signals representing the program memory address of the beginning instruction of a task were withdrawn contains another filled but unsampled location; and, (b) seventh means responsive to said sixth means for modifying the signals stored in said control flag memory area when there is another said filled but unsampled location.

39. A multiprocessor system as claimed in claim 37 and further including means for updating and restoring in said addressed reference control memory location signals representing the task table memory area location address.

40. A multiprocessor system as claimed in claim 37 wherein said control flag memory area stores signals representing a control flag word having a separate first field individually assigned to each task table memory area, said first field comprising signals indicating that the corresponding task table memory area has at least one filled addressable location which has not been sampled, said third means including means for sequentially examining the separate first fields of the control flag word.

41. A multiprocessor system according to claim 40 and further including:

(a) sixth means for determining if the task table memory area from which said signals representing the program memory address of the beginning instruction of a task were withdrawn contains another filled but unsampled location; and, (b) seventh means responsive to said sixth means for modifying the signals stored in said first field of said control flag word and corresponding to the task table memory area from which said beginning instruction was withdrawn, if said sixth means determines that said task table memory area does not contain another filled but unsampled location.

42. A method of programming an electronic multiprocessor data system of the type wherein each processor has access to a common memory means and said memory means includes a program memory area having addressable locations for storing instruction words of different programs, plural task table memory areas to which are assigned different relative priorities and with each area having at least one addressable location which can be filled with a program memory area location address of a beginning instruction word of a task control flag memory area for storing data which both can indicate current use of the task tables by any processor and can identify at least the highest priority task table memory area having such a filled addressable location which has not as yet been sampled, and reference control memory area having at least one separable addressable location individually assigned to each task table memory area for storing the corresponding task table memory area address of one such filled but unsampled location, said method comprising a take task executive control programming method whereby each processor may withdraw a program memory area location address of the beginning instruction word of a task from the task table memory areas by executing the steps of:

(a) determining if the control flag memory area data indicates current use of the task table memory areas by any processor, and if not, then changing the control flag memory area data to indicate current use thereof by the processor;

(b) ascertaining, from the control flag memory area data, the identification of the highest priority task table memory area in which there is an addressable location filled with an unsampled program memory area location address of a beginning instruction word;

(c) using said task table memory area identification to acquire, from a corresponding assigned reference control memory area addressable location, the corresponding task table memory area address of such a filled but unsampled location.

References Cited
UNITED STATES PATENTS 3,348,210   10/1967   Ochsner _____ 340—172.5

RAULFE B. ZACHE, Primary Examiner